US 10,975,570 B2

(12) United States Patent
Shen

(10) Patent No.: US 10,975,570 B2
(45) Date of Patent: Apr. 13, 2021

(54) ADJUSTABLE HANGER BAR ASSEMBLY

(71) Applicant: DMF, Inc., Carson, CA (US)

(72) Inventor: Tony Shen, Eastvale, CA (US)

(73) Assignee: DMF, Inc., Carson, CA (US)

( * ) Notice: Subject to any disclaimer, the term of this patent is extended or adjusted under 35 U.S.C. 154(b) by 0 days.

(21) Appl. No.: 16/886,365

(22) Filed: May 28, 2020

(65) Prior Publication Data

US 2020/0291652 A1 Sep. 17, 2020

Related U.S. Application Data

(63) Continuation of application No. PCT/US2018/062868, filed on Nov. 28, 2018.

(60) Provisional application No. 62/591,594, filed on Nov. 28, 2017.

(51) Int. Cl.
*E04C 3/04* (2006.01)
*F21S 8/02* (2006.01)
*F21S 8/04* (2006.01)
*F21V 21/04* (2006.01)

(52) U.S. Cl.
CPC ............... *E04C 3/04* (2013.01); *F21S 8/026* (2013.01); *F21S 8/043* (2013.01); *F21V 21/048* (2013.01); *E04C 2003/0408* (2013.01); *E04C 2003/0443* (2013.01)

(58) Field of Classification Search
CPC ............... E04C 3/04; E04C 2003/0443; E04C 2003/0408; F21S 8/043; F21S 8/026; F21V 21/048
USPC ........................................ 248/340, 343, 344
See application file for complete search history.

(56) References Cited

U.S. PATENT DOCUMENTS

| 1,133,535 | A | 3/1915 | Cain et al. |
| 1,471,340 | A | 10/1923 | Knight |
| 1,856,356 | A | 5/1932 | Owen |
| 2,038,784 | A | 4/1936 | Ghadiali |

(Continued)

FOREIGN PATENT DOCUMENTS

| CA | 2243934 C | 6/2002 |
| CA | 2502637 A1 | 9/2005 |

(Continued)

OTHER PUBLICATIONS

U.S. Appl. No. 15/637,742, filed Jun. 29, 2017, Kopitzke, IV.

(Continued)

*Primary Examiner* — Muhammad Ijaz
(74) *Attorney, Agent, or Firm* — Smith Baluch LLP

(57) ABSTRACT

A hanger bar assembly comprises a first hanger bar, a second hanger bar, and a hanger bar holder. The first hanger bar and the second hanger bar are mechanically coupled where the first hanger bar slides relative to the second hang bar in a telescopic manner. The first hanger bar and the second hanger bar both include an interlocking structure that interlocks the first hanger bar with the second hanger bar, reducing lateral movement, such as backlash or slop. The hanger bar holder is used to hold at least one of the first hanger bar or the second hanger bar. The hanger bar holder includes a first section to guide at least the first hanger bar and a second section to guide at least the second hanger bar. The first section and the second section also constrain lateral movement of the first hanger bar and the second hanger bar, respectively.

30 Claims, 8 Drawing Sheets

(56) References Cited

U.S. PATENT DOCUMENTS

| | | | |
|---|---|---|---|
| 2,179,161 | A | 11/1939 | Rambusch |
| 2,197,737 | A | 4/1940 | Appleton |
| 2,352,913 | A | 7/1944 | Morrill |
| 2,528,989 | A | 11/1950 | Ammells |
| 2,597,595 | A | 5/1952 | Ordas |
| 2,642,246 | A | 6/1953 | Larry |
| 2,670,919 | A | 3/1954 | Vincent |
| 2,697,535 | A | 12/1954 | Olson |
| 2,758,810 | A | 8/1956 | Good |
| D180,844 | S | 8/1957 | Poliakoff |
| 2,802,933 | A | 8/1957 | Harry |
| 2,998,512 | A | 8/1961 | Duchene et al. |
| 3,023,920 | A | 3/1962 | Cook et al. |
| 3,057,993 | A | 10/1962 | Gellert |
| 3,104,087 | A | 9/1963 | Joseph et al. |
| 3,214,126 | A * | 10/1965 | Roos ............... H02G 3/125 248/318 |
| 3,422,261 | A | 1/1969 | McGinty |
| 3,460,299 | A | 8/1969 | Wilson |
| 3,650,046 | A | 3/1972 | Skinner |
| 3,675,807 | A | 7/1972 | Lund et al. |
| 3,700,885 | A | 10/1972 | Bobrick |
| 3,711,053 | A | 1/1973 | Drake |
| D227,989 | S | 7/1973 | Geisel |
| 3,773,968 | A | 11/1973 | Copp |
| 3,812,342 | A | 5/1974 | Mcnamara |
| 3,836,766 | A | 9/1974 | Auerbach |
| 3,874,035 | A | 4/1975 | Schuplin |
| 3,913,773 | A | 10/1975 | Copp et al. |
| D245,905 | S | 9/1977 | Taylor |
| 4,088,827 | A | 5/1978 | Kohaut |
| 4,154,218 | A | 5/1979 | Hulet |
| 4,154,219 | A | 5/1979 | Gupta et al. |
| 4,176,758 | A | 12/1979 | Glick |
| 4,280,169 | A | 7/1981 | Allen |
| 4,399,497 | A | 8/1983 | Druffel |
| 4,450,512 | A | 5/1984 | Kristofek |
| 4,520,435 | A | 5/1985 | Baldwin |
| 4,539,629 | A | 9/1985 | Poppenheimer |
| 4,601,145 | A | 7/1986 | Wilcox |
| 4,667,840 | A | 5/1987 | Lindsey |
| 4,723,747 | A | 2/1988 | Karp et al. |
| 4,729,080 | A | 3/1988 | Fremont et al. |
| 4,754,377 | A | 6/1988 | Wenman |
| 4,770,311 | A | 9/1988 | Wang |
| 4,880,128 | A | 11/1989 | Jorgensen |
| 4,910,651 | A | 3/1990 | Montanez |
| 4,919,292 | A | 4/1990 | Hsu |
| 4,929,187 | A | 5/1990 | Hudson et al. |
| 4,930,054 | A | 5/1990 | Krebs |
| 5,044,582 | A * | 9/1991 | Walters ............... H02G 3/126 248/57 |
| 5,216,203 | A | 6/1993 | Gower |
| 5,222,800 | A | 6/1993 | Chan et al. |
| 5,239,132 | A | 8/1993 | Bartow |
| 5,250,269 | A | 10/1993 | Langer et al. |
| 5,266,050 | A | 11/1993 | O'Neil et al. |
| 5,303,894 | A | 4/1994 | Deschamps et al. |
| 5,382,752 | A | 1/1995 | Reyhan et al. |
| 5,420,376 | A | 5/1995 | Rajecki et al. |
| 5,444,606 | A | 8/1995 | Barnes et al. |
| 5,465,199 | A | 11/1995 | Bray et al. |
| 5,505,419 | A | 4/1996 | Gabrius |
| 5,544,870 | A | 8/1996 | Kelly et al. |
| 5,562,343 | A | 10/1996 | Chan et al. |
| 5,571,993 | A | 11/1996 | Jones et al. |
| 5,580,158 | A | 12/1996 | Aubrey et al. |
| 5,588,737 | A | 12/1996 | Kusmer |
| 5,603,424 | A | 2/1997 | Bordwell et al. |
| 5,609,408 | A | 3/1997 | Targetti |
| 5,613,338 | A | 3/1997 | Esposito |
| D381,111 | S | 7/1997 | Lecluze |
| 5,662,413 | A | 9/1997 | Akiyama et al. |
| D386,277 | S | 11/1997 | Lecluze |
| 5,690,423 | A | 11/1997 | Hentz et al. |
| D387,466 | S | 12/1997 | Lecluze |
| 5,738,436 | A | 4/1998 | Cummings et al. |
| 5,836,678 | A | 11/1998 | Wright et al. |
| 5,942,726 | A | 8/1999 | Reiker |
| 5,944,412 | A | 9/1999 | Janos et al. |
| 5,957,573 | A | 9/1999 | Wedekind et al. |
| 5,975,323 | A | 11/1999 | Turan |
| 6,082,878 | A | 7/2000 | Doubek et al. |
| 6,095,669 | A | 8/2000 | Cho |
| 6,098,945 | A * | 8/2000 | Korcz ............... H02G 3/125 220/3.9 |
| 6,105,334 | A | 8/2000 | Monson et al. |
| 6,161,910 | A | 12/2000 | Reisenauer et al. |
| 6,170,685 | B1 | 1/2001 | Currier |
| 6,170,965 | B1 | 1/2001 | Kotovsky |
| 6,174,076 | B1 | 1/2001 | Petrakis et al. |
| 6,176,599 | B1 | 1/2001 | Farzen |
| 6,267,491 | B1 | 7/2001 | Parrigin |
| 6,332,597 | B1 * | 12/2001 | Korcz ............... H02G 3/125 220/3.9 |
| 6,350,043 | B1 | 2/2002 | Gloisten |
| 6,350,046 | B1 | 2/2002 | Lau |
| 6,364,511 | B1 | 4/2002 | Cohen |
| 6,375,338 | B1 | 4/2002 | Cummings et al. |
| 6,402,112 | B1 | 6/2002 | Thomas et al. |
| D461,455 | S | 8/2002 | Forbes |
| 6,461,016 | B1 | 10/2002 | Jamison et al. |
| 6,474,846 | B1 | 11/2002 | Kelmelis et al. |
| 6,491,413 | B1 | 12/2002 | Benesohn |
| D468,697 | S | 1/2003 | Straub, Jr. |
| D470,970 | S | 2/2003 | Huang |
| 6,515,313 | B1 | 2/2003 | Ibbetson et al. |
| 6,521,833 | B1 | 2/2003 | DeFreitas |
| D471,657 | S | 3/2003 | Huang |
| 6,583,573 | B2 | 6/2003 | Bierman |
| 6,585,389 | B2 | 7/2003 | Bonazzi |
| 6,600,175 | B1 | 7/2003 | Baretz et al. |
| D478,872 | S | 8/2003 | Heggem |
| 6,632,006 | B1 | 10/2003 | Rippel et al. |
| 6,657,236 | B1 | 12/2003 | Thibeault et al. |
| 6,666,419 | B1 | 12/2003 | Vrame |
| D487,600 | S | 3/2004 | Fickas |
| D488,583 | S | 4/2004 | Benghozi |
| 6,719,438 | B2 | 4/2004 | Sevack et al. |
| 6,758,578 | B1 | 7/2004 | Chou |
| 6,777,615 | B1 | 8/2004 | Gretz |
| 6,779,908 | B1 | 8/2004 | Ng |
| 6,827,229 | B2 | 12/2004 | Dinh et al. |
| 6,838,618 | B2 | 1/2005 | Newbold et al. |
| 6,906,352 | B2 | 6/2005 | Edmond et al. |
| D509,314 | S | 9/2005 | Rashidi |
| 6,948,829 | B2 | 9/2005 | Verdes et al. |
| 6,958,497 | B2 | 10/2005 | Emerson et al. |
| 6,964,501 | B2 | 11/2005 | Ryan |
| 6,967,284 | B1 | 11/2005 | Gretz |
| D516,235 | S | 2/2006 | Rashidi |
| 7,025,476 | B2 | 4/2006 | Leadford |
| 7,025,477 | B2 | 4/2006 | Blessing |
| 7,064,269 | B2 | 6/2006 | Smith |
| D528,673 | S | 9/2006 | Maxik et al. |
| 7,102,172 | B2 | 9/2006 | Lynch |
| D531,740 | S | 11/2006 | Maxik |
| D532,532 | S | 11/2006 | Maxik |
| 7,148,420 | B1 | 12/2006 | Johnson et al. |
| 7,148,632 | B2 | 12/2006 | Berman et al. |
| 7,152,985 | B2 | 12/2006 | Benitez et al. |
| 7,154,040 | B1 | 12/2006 | Tompkins |
| 7,170,015 | B1 | 1/2007 | Roesch et al. |
| D536,349 | S | 2/2007 | Humber et al. |
| D537,039 | S | 2/2007 | Pincek |
| 7,181,378 | B2 | 2/2007 | Benitez et al. |
| D539,229 | S | 3/2007 | Murphey |
| 7,186,008 | B2 | 3/2007 | Patti |
| 7,190,126 | B1 | 3/2007 | Paton |
| 7,211,833 | B2 | 5/2007 | Slater, Jr. et al. |
| 7,213,940 | B1 | 5/2007 | Van De Ven et al. |
| 7,234,674 | B2 | 6/2007 | Rippel et al. |
| D547,889 | S | 7/2007 | Huang |
| D552,969 | S | 10/2007 | Bobrowski et al. |

(56) References Cited

U.S. PATENT DOCUMENTS

| | | |
|---|---|---|
| D553,267 S | 10/2007 | Yuen |
| D555,106 S | 11/2007 | Pape et al. |
| D556,144 S | 11/2007 | Dinh |
| 7,297,870 B1 | 11/2007 | Sartini |
| 7,312,474 B2 | 12/2007 | Emerson et al. |
| 7,320,536 B2 | 1/2008 | Petrakis et al. |
| D561,372 S | 2/2008 | Yan |
| D561,373 S | 2/2008 | Yan |
| 7,335,920 B2 | 2/2008 | Denbaars et al. |
| D563,896 S | 3/2008 | Greenslate |
| 7,347,580 B2 | 3/2008 | Blackman et al. |
| D570,012 S | 5/2008 | Huang |
| 7,374,308 B2 | 5/2008 | Sevack et al. |
| D570,504 S | 6/2008 | Maxik et al. |
| D570,505 S | 6/2008 | Maxik et al. |
| 7,399,104 B2 | 7/2008 | Rappaport |
| 7,429,025 B1 | 9/2008 | Gretz |
| D578,677 S | 10/2008 | Huang |
| 7,431,482 B1 | 10/2008 | Morgan et al. |
| 7,432,440 B2 | 10/2008 | Hull et al. |
| 7,442,883 B2 | 10/2008 | Jolly et al. |
| 7,446,345 B2 | 11/2008 | Emerson et al. |
| 7,470,048 B2 | 12/2008 | Wu |
| 7,473,005 B2 | 1/2009 | O'Brien |
| 7,488,097 B2 | 2/2009 | Reisenauer et al. |
| 7,494,258 B2 | 2/2009 | McNaught |
| 7,503,145 B2 | 3/2009 | Newbold et al. |
| 7,524,089 B2 | 4/2009 | Park |
| D591,894 S | 5/2009 | Flank |
| 7,534,989 B2 | 5/2009 | Suehara et al. |
| D596,154 S | 7/2009 | Rivkin |
| 7,566,154 B2 | 7/2009 | Gloisten et al. |
| D599,040 S | 8/2009 | Alexander et al. |
| D600,836 S | 9/2009 | Hanley et al. |
| 7,588,359 B2 | 9/2009 | Coushaine et al. |
| 7,592,583 B2 | 9/2009 | Page et al. |
| D606,696 S | 12/2009 | Chen et al. |
| 7,625,105 B1 | 12/2009 | Johnson |
| 7,628,513 B2 | 12/2009 | Chiu |
| 7,651,238 B2 | 1/2010 | O'Brien |
| 7,654,705 B2 | 2/2010 | Czech et al. |
| D611,650 S | 3/2010 | Broekhoff |
| 7,670,021 B2 | 3/2010 | Chou |
| 7,673,841 B2 | 3/2010 | Wronski |
| 7,677,766 B2 | 3/2010 | Boyer |
| 7,692,182 B2 | 4/2010 | Bergmann et al. |
| 7,704,763 B2 | 4/2010 | Fujii et al. |
| D616,118 S | 5/2010 | Thomas et al. |
| 7,722,208 B1 | 5/2010 | Dupre et al. |
| 7,722,227 B2 | 5/2010 | Zhang et al. |
| 7,735,795 B2 | 6/2010 | Wronski |
| 7,735,798 B2 | 6/2010 | Kojima |
| 7,748,887 B2 | 7/2010 | Zampini, II et al. |
| 7,766,518 B2 | 8/2010 | Piepgras et al. |
| 7,769,192 B2 | 8/2010 | Takagi et al. |
| 7,771,082 B2 | 8/2010 | Peng |
| 7,771,094 B2 | 8/2010 | Goode |
| 7,784,754 B2 | 8/2010 | Nevers et al. |
| D624,691 S | 9/2010 | Zhang et al. |
| D624,692 S | 9/2010 | Mackin et al. |
| D625,847 S | 10/2010 | Maglica |
| D625,876 S | 10/2010 | Chen et al. |
| D627,727 S | 11/2010 | Alexander et al. |
| 7,828,465 B2 | 11/2010 | Roberge et al. |
| D629,366 S | 12/2010 | Ericson et al. |
| 7,857,275 B2 | 12/2010 | de la Borbolla |
| 7,871,184 B2 | 1/2011 | Peng |
| 7,874,539 B2 | 1/2011 | Wright et al. |
| 7,874,703 B2 | 1/2011 | Shastry et al. |
| 7,874,709 B1 | 1/2011 | Beadle |
| D633,224 S | 2/2011 | Lee |
| D636,903 S | 4/2011 | Torenbeek |
| D637,339 S | 5/2011 | Hasan et al. |
| D637,340 S | 5/2011 | Hasan et al. |
| 7,950,832 B2 | 5/2011 | Tanaka et al. |
| D639,499 S | 6/2011 | Choi et al. |
| D640,819 S | 6/2011 | Pan |
| 7,956,546 B2 | 6/2011 | Hasnain |
| 7,959,332 B2 | 6/2011 | Tickner et al. |
| 7,967,480 B2 | 6/2011 | Pickard et al. |
| D642,317 S | 7/2011 | Rashidi |
| 7,972,035 B2 | 7/2011 | Boyer |
| 7,972,043 B2 | 7/2011 | Schutte |
| D642,536 S | 8/2011 | Robinson |
| D643,970 S | 8/2011 | Kim et al. |
| 8,002,425 B2 | 8/2011 | Russo et al. |
| D646,011 S | 9/2011 | Rashidi |
| 8,013,243 B2 | 9/2011 | Korcz et al. |
| 8,038,113 B2 | 10/2011 | Fryzek et al. |
| D648,476 S | 11/2011 | Choi et al. |
| D648,477 S | 11/2011 | Kim et al. |
| D650,115 S | 12/2011 | Kim et al. |
| 8,070,328 B1 | 12/2011 | Knoble et al. |
| 8,096,670 B2 | 1/2012 | Trott |
| D654,205 S | 2/2012 | Rashidi |
| D656,262 S | 3/2012 | Yoshinobu et al. |
| D656,263 S | 3/2012 | Ogawa et al. |
| 8,142,057 B2 | 3/2012 | Roos et al. |
| 8,152,334 B2 | 4/2012 | Krogman |
| D658,788 S | 5/2012 | Dudik et al. |
| D658,802 S | 5/2012 | Chen |
| D659,862 S | 5/2012 | Tsai |
| D659,879 S | 5/2012 | Rashidi |
| D660,814 S | 5/2012 | Wilson |
| 8,182,116 B2 | 5/2012 | Zhang et al. |
| 8,201,968 B2 | 6/2012 | Maxik et al. |
| D663,058 S | 7/2012 | Pan |
| D663,466 S | 7/2012 | Rashidi |
| D664,274 S | 7/2012 | de Visser et al. |
| D664,705 S | 7/2012 | Kong et al. |
| 8,215,805 B2 | 7/2012 | Cogliano et al. |
| 8,220,970 B1 | 7/2012 | Khazi et al. |
| 8,226,270 B2 | 7/2012 | Yamamoto et al. |
| 8,235,549 B2 | 8/2012 | Gingrich, III et al. |
| 8,238,050 B2 | 8/2012 | Minano et al. |
| 8,240,630 B2 | 8/2012 | Wronski |
| D667,155 S | 9/2012 | Rashidi |
| 8,262,255 B1 | 9/2012 | Rashidi |
| D668,372 S | 10/2012 | Renshaw et al. |
| D668,809 S | 10/2012 | Rashidi |
| D669,198 S | 10/2012 | Qui |
| D669,199 S | 10/2012 | Chuang |
| D669,620 S | 10/2012 | Rashidi |
| 8,277,090 B2 | 10/2012 | Fryzek et al. |
| D671,668 S | 11/2012 | Rowlette, Jr. et al. |
| 8,308,322 B2 | 11/2012 | Santiago et al. |
| D672,899 S | 12/2012 | Ven et al. |
| D673,869 S | 1/2013 | Yu |
| D676,263 S | 2/2013 | Birke |
| D676,814 S | 2/2013 | Paul |
| 8,376,593 B2 | 2/2013 | Bazydola et al. |
| D677,417 S | 3/2013 | Rashidi |
| D677,634 S | 3/2013 | Korcz et al. |
| D679,044 S | 3/2013 | Jeswani et al. |
| D679,047 S | 3/2013 | Tickner et al. |
| 8,403,533 B1 | 3/2013 | Paulsel |
| 8,403,541 B1 | 3/2013 | Rashidi |
| D681,259 S | 4/2013 | Kong |
| 8,408,759 B1 | 4/2013 | Rashidi |
| D682,459 S | 5/2013 | Gordin et al. |
| D683,063 S | 5/2013 | Lopez et al. |
| D683,890 S | 6/2013 | Lopez et al. |
| D684,269 S | 6/2013 | Wang et al. |
| D684,287 S | 6/2013 | Rashidi |
| D684,719 S | 6/2013 | Rashidi |
| D685,118 S | 6/2013 | Rashidi |
| D685,120 S | 6/2013 | Rashidi |
| 8,454,204 B1 | 6/2013 | Chang et al. |
| D685,507 S | 7/2013 | Sun |
| D687,586 S | 8/2013 | Rashidi |
| D687,587 S | 8/2013 | Rashidi |
| D687,588 S | 8/2013 | Rashidi |
| D687,980 S | 8/2013 | Gravely et al. |
| D688,405 S | 8/2013 | Kim et al. |

(56) References Cited

U.S. PATENT DOCUMENTS

| | | |
|---|---|---|
| 8,506,127 B2 | 8/2013 | Russello et al. |
| 8,506,134 B2 | 8/2013 | Wilson et al. |
| D690,049 S | 9/2013 | Rashidi |
| D690,864 S | 10/2013 | Rashidi |
| D690,865 S | 10/2013 | Rashidi |
| D690,866 S | 10/2013 | Rashidi |
| D691,314 S | 10/2013 | Rashidi |
| D691,315 S | 10/2013 | Samson |
| D691,763 S | 10/2013 | Hand et al. |
| 8,550,669 B2 | 10/2013 | Macwan et al. |
| D693,043 S | 11/2013 | Schmalfuss et al. |
| D693,517 S | 11/2013 | Davis |
| D694,456 S | 11/2013 | Rowlette, Jr. et al. |
| 8,573,816 B2 | 11/2013 | Negley et al. |
| D695,441 S | 12/2013 | Lui et al. |
| D695,941 S | 12/2013 | Rashidi |
| D696,446 S | 12/2013 | Huh |
| D696,447 S | 12/2013 | Huh |
| D696,448 S | 12/2013 | Huh |
| 8,602,601 B2 | 12/2013 | Khazi et al. |
| D698,067 S | 1/2014 | Rashidi |
| D698,068 S | 1/2014 | Rashidi |
| 8,622,361 B2 | 1/2014 | Wronski |
| 8,632,040 B2 * | 1/2014 | Mass ................. E04B 9/006 248/343 |
| D698,985 S | 2/2014 | Lopez et al. |
| D699,384 S | 2/2014 | Rashidi |
| D699,687 S | 2/2014 | Baldwin et al. |
| D700,387 S | 2/2014 | Snell |
| 8,641,243 B1 | 2/2014 | Rashidi |
| 8,659,034 B2 | 2/2014 | Baretz et al. |
| D700,991 S | 3/2014 | Johnson et al. |
| D701,175 S | 3/2014 | Baldwin et al. |
| D701,466 S | 3/2014 | Clifford et al. |
| 8,672,518 B2 | 3/2014 | Boomgaarden et al. |
| D702,867 S | 4/2014 | Kim et al. |
| D703,843 S | 4/2014 | Cheng |
| 8,684,569 B2 | 4/2014 | Pickard et al. |
| D705,472 S | 5/2014 | Huh |
| 8,727,582 B2 | 5/2014 | Brown et al. |
| D708,381 S | 7/2014 | Rashidi |
| 8,777,449 B2 | 7/2014 | Ven et al. |
| D710,529 S | 8/2014 | Lopez et al. |
| 8,801,217 B2 | 8/2014 | Oehle et al. |
| 8,820,985 B1 | 9/2014 | Tam et al. |
| 8,833,013 B2 | 9/2014 | Harman |
| 8,845,144 B1 | 9/2014 | Davies et al. |
| D714,989 S | 10/2014 | Rowlette, Jr. et al. |
| 8,870,426 B2 | 10/2014 | Biebl et al. |
| 8,888,332 B2 | 11/2014 | Martis et al. |
| 8,890,414 B2 | 11/2014 | Rowlette, Jr. et al. |
| D721,845 S | 1/2015 | Lui et al. |
| 8,926,133 B2 | 1/2015 | Booth |
| 8,939,418 B2 | 1/2015 | Green et al. |
| D722,296 S | 2/2015 | Taylor |
| D722,977 S | 2/2015 | Hagarty |
| D722,978 S | 2/2015 | Hagarty |
| 8,950,898 B2 | 2/2015 | Catalano |
| D723,781 S | 3/2015 | Miner |
| D723,783 S | 3/2015 | Miner |
| D725,359 S | 3/2015 | Miner |
| 8,967,575 B1 * | 3/2015 | Gretz ................. H05K 5/0204 248/343 |
| D726,363 S | 4/2015 | Danesh |
| D726,949 S | 4/2015 | Redfern |
| 9,004,435 B2 | 4/2015 | Wronski |
| 9,039,254 B2 | 5/2015 | Danesh |
| D731,689 S | 6/2015 | Bernard et al. |
| 9,062,866 B1 | 6/2015 | Christ et al. |
| 9,065,264 B2 | 6/2015 | Cooper et al. |
| 9,068,719 B2 | 6/2015 | Van De Ven et al. |
| 9,068,722 B2 | 6/2015 | Wronski et al. |
| D734,525 S | 7/2015 | Gordin et al. |
| D735,012 S | 7/2015 | Cowie |
| D735,142 S | 7/2015 | Hagarty |
| 9,078,299 B2 | 7/2015 | Ashdown |
| 9,109,760 B2 | 8/2015 | Shum et al. |
| D739,355 S | 9/2015 | D'Aubeterre |
| D739,590 S | 9/2015 | Redfern |
| 9,140,441 B2 | 9/2015 | Goelz et al. |
| D741,538 S | 10/2015 | Ghasabi |
| D742,325 S | 10/2015 | Leung |
| 9,151,457 B2 | 10/2015 | Pickard et al. |
| 9,151,477 B2 | 10/2015 | Pickard et al. |
| D743,079 S | 11/2015 | Adair |
| D744,723 S | 12/2015 | Yoo |
| 9,217,560 B2 | 12/2015 | Harbers et al. |
| 9,222,661 B2 | 12/2015 | Kim et al. |
| 9,239,131 B1 | 1/2016 | Wronski et al. |
| D750,317 S | 2/2016 | Lui et al. |
| 9,285,103 B2 | 3/2016 | Van De Ven et al. |
| 9,291,319 B2 | 3/2016 | Kathawate et al. |
| 9,301,362 B2 | 3/2016 | Dohn et al. |
| D754,078 S | 4/2016 | Baldwin et al. |
| D754,079 S | 4/2016 | Baldwin et al. |
| D754,605 S | 4/2016 | McMillan |
| 9,303,812 B2 | 4/2016 | Green et al. |
| 9,310,038 B2 | 4/2016 | Athalye |
| 9,310,052 B1 | 4/2016 | Shum |
| 9,322,543 B2 | 4/2016 | Hussell et al. |
| D756,025 S | 5/2016 | Wronski et al. |
| 9,347,655 B2 | 5/2016 | Boomgaarden et al. |
| 9,371,966 B2 | 6/2016 | Rowlette, Jr. et al. |
| D762,181 S | 7/2016 | Lin |
| 9,395,051 B2 | 7/2016 | Hussell et al. |
| D762,906 S | 8/2016 | Jeswani et al. |
| D764,079 S | 8/2016 | Wu |
| 9,404,639 B2 | 8/2016 | Bailey et al. |
| 9,417,506 B1 | 8/2016 | Tirosh |
| D766,185 S | 9/2016 | Hagarty |
| D767,199 S | 9/2016 | Wronski et al. |
| 9,447,917 B1 | 9/2016 | Wronski et al. |
| 9,447,953 B2 | 9/2016 | Lawlor |
| D768,325 S | 10/2016 | Xu |
| D768,326 S | 10/2016 | Guzzini |
| D769,501 S | 10/2016 | Jeswani et al. |
| D770,065 S | 10/2016 | Tittle |
| D770,076 S | 10/2016 | Li et al. |
| 9,476,552 B2 | 10/2016 | Myers et al. |
| 9,488,324 B2 | 11/2016 | Shum et al. |
| D774,676 S | 12/2016 | Ng |
| D776,324 S | 1/2017 | Gierl et al. |
| D777,967 S | 1/2017 | Redfern |
| 9,534,751 B2 | 1/2017 | Maglica et al. |
| D778,241 S | 2/2017 | Holbrook et al. |
| D778,484 S | 2/2017 | Guzzini |
| D779,100 S | 2/2017 | Redfern |
| 9,581,302 B2 | 2/2017 | Danesh |
| 9,599,315 B1 | 3/2017 | Harpenau et al. |
| 9,605,842 B1 | 3/2017 | Davis |
| 9,605,910 B2 | 3/2017 | Swedberg et al. |
| D785,228 S | 4/2017 | Guzzini |
| D786,472 S | 5/2017 | Redfern |
| D786,474 S | 5/2017 | Fujisawa |
| D788,330 S | 5/2017 | Johnson et al. |
| D790,102 S | 6/2017 | Guzzini |
| 9,673,597 B2 | 6/2017 | Lee |
| 9,689,541 B2 | 6/2017 | Wronski |
| D791,709 S | 7/2017 | Holton |
| D791,711 S | 7/2017 | Holton |
| D791,712 S | 7/2017 | Holton |
| 9,696,021 B2 | 7/2017 | Wronski |
| 9,702,516 B1 | 7/2017 | Vasquez et al. |
| D795,820 S | 8/2017 | Wengreen |
| 9,732,904 B1 | 8/2017 | Wronski |
| 9,739,464 B2 | 8/2017 | Wronski |
| D799,105 S | 10/2017 | Eder et al. |
| D800,957 S | 10/2017 | Eder et al. |
| 9,791,111 B1 | 10/2017 | Huang et al. |
| 9,797,562 B2 | 10/2017 | Dabiet et al. |
| 9,803,839 B2 | 10/2017 | Visser et al. |
| D805,660 S | 12/2017 | Creasman et al. |
| D809,176 S | 1/2018 | Partington |
| 9,860,961 B2 | 1/2018 | Chemel et al. |

(56) References Cited

U.S. PATENT DOCUMENTS

| | | |
|---|---|---|
| 9,863,619 B2 | 1/2018 | Mak |
| D809,465 S | 2/2018 | Keirstead |
| 9,903,569 B2 | 2/2018 | O'Brien et al. |
| 9,964,266 B2 | 5/2018 | Danesh |
| D820,494 S | 6/2018 | Cohen |
| D821,615 S | 6/2018 | Trice |
| D821,627 S | 6/2018 | Ko |
| 9,995,441 B2 | 6/2018 | Power et al. |
| D822,505 S | 7/2018 | Gibson et al. |
| D824,494 S | 7/2018 | Martins et al. |
| D825,829 S | 8/2018 | Guo |
| 10,041,638 B2 | 8/2018 | Vasquez et al. |
| D832,218 S | 10/2018 | Wronski et al. |
| D833,977 S | 11/2018 | Danesh et al. |
| 10,125,959 B2 | 11/2018 | Cohen |
| 10,139,059 B2 | 11/2018 | Danesh |
| D836,976 S | 1/2019 | Reese et al. |
| D847,414 S | 4/2019 | Danesh et al. |
| D847,415 S | 4/2019 | Danesh et al. |
| 10,247,390 B1 | 4/2019 | Kopitzke et al. |
| D848,375 S | 5/2019 | Danesh et al. |
| 10,281,131 B2 | 5/2019 | Cohen |
| 10,295,163 B1 | 5/2019 | Cohen |
| D850,695 S | 6/2019 | Dabiet et al. |
| D851,046 S | 6/2019 | Peng et al. |
| 10,408,395 B2 | 9/2019 | Danesh |
| 10,408,396 B2 | 9/2019 | Wronski et al. |
| D863,661 S | 10/2019 | Tian et al. |
| D864,877 S | 10/2019 | Danesh |
| D867,653 S | 11/2019 | Gorman |
| 10,488,000 B2 | 11/2019 | Danesh et al. |
| 10,551,044 B2 | 2/2020 | Peng et al. |
| 10,563,850 B2 | 2/2020 | Danesh |
| D880,733 S | 4/2020 | Lo et al. |
| D883,562 S | 5/2020 | Hu |
| D885,648 S | 5/2020 | Zeng |
| D885,649 S | 5/2020 | McLaughlin, III et al. |
| 10,663,127 B2 | 5/2020 | Danesh et al. |
| 10,663,153 B2 | 5/2020 | Nikooyan et al. |
| D888,313 S | 6/2020 | Xie et al. |
| 10,683,994 B2 | 6/2020 | Wronski et al. |
| 10,684,003 B2 | 6/2020 | Wronski et al. |
| D890,410 S | 7/2020 | Stanford et al. |
| 10,753,558 B2 | 8/2020 | Danesh |
| 10,816,148 B2 | 10/2020 | Danesh |
| D901,745 S | 11/2020 | Yang |
| 2002/0172047 A1 | 11/2002 | Ashley |
| 2003/0006353 A1 | 1/2003 | Dinh et al. |
| 2003/0016532 A1 | 1/2003 | Reed |
| 2003/0021104 A1 | 1/2003 | Tsao |
| 2003/0161153 A1 | 8/2003 | Patti |
| 2004/0001337 A1 | 1/2004 | Defouw et al. |
| 2004/0120141 A1 | 6/2004 | Beadle |
| 2004/0156199 A1 | 8/2004 | Rivas et al. |
| 2005/0225966 A1 | 10/2005 | Hartmann et al. |
| 2005/0227536 A1 | 10/2005 | Gamache et al. |
| 2005/0231962 A1 | 10/2005 | Koba et al. |
| 2005/0237746 A1 | 10/2005 | Yiu |
| 2006/0005988 A1 | 1/2006 | Jorgensen |
| 2006/0158873 A1 | 7/2006 | Newbold et al. |
| 2006/0198126 A1 | 9/2006 | Jones |
| 2006/0215408 A1 | 9/2006 | Lee |
| 2006/0221620 A1 | 10/2006 | Thomas |
| 2006/0237601 A1 | 10/2006 | Rinderer |
| 2006/0243877 A1 | 11/2006 | Rippel |
| 2006/0250788 A1 | 11/2006 | Hodge et al. |
| 2006/0262545 A1 | 11/2006 | Piepgras et al. |
| 2007/0035951 A1 | 2/2007 | Tseng |
| 2007/0131827 A1 | 6/2007 | Nevers et al. |
| 2007/0185675 A1 | 8/2007 | Papamichael et al. |
| 2007/0200039 A1 | 8/2007 | Petak |
| 2007/0206374 A1 | 9/2007 | Petrakis et al. |
| 2008/0002414 A1 | 1/2008 | Miletich et al. |
| 2008/0019138 A1 | 1/2008 | Otte et al. |
| 2008/0112168 A1 | 5/2008 | Pickard et al. |
| 2008/0112170 A1 | 5/2008 | Trott |
| 2008/0112171 A1 | 5/2008 | Patti et al. |
| 2008/0130308 A1 | 6/2008 | Behr et al. |
| 2008/0137347 A1 | 6/2008 | Trott et al. |
| 2008/0165545 A1 | 7/2008 | O'Brien |
| 2008/0170404 A1 | 7/2008 | Steer et al. |
| 2008/0224008 A1 | 9/2008 | Dal Ponte et al. |
| 2008/0232116 A1 | 9/2008 | Kim |
| 2008/0247181 A1 | 10/2008 | Dixon |
| 2008/0285271 A1 | 11/2008 | Roberge et al. |
| 2009/0003009 A1 | 1/2009 | Tessnow et al. |
| 2009/0034261 A1 | 2/2009 | Grove |
| 2009/0080189 A1 | 3/2009 | Wegner |
| 2009/0086484 A1 | 4/2009 | Johnson |
| 2009/0097262 A1 | 4/2009 | Zhang et al. |
| 2009/0135613 A1 | 5/2009 | Peng |
| 2009/0141500 A1 | 6/2009 | Peng |
| 2009/0141506 A1 | 6/2009 | Lan et al. |
| 2009/0141508 A1 | 6/2009 | Peng |
| 2009/0147517 A1 | 6/2009 | Li |
| 2009/0161356 A1 | 6/2009 | Negley et al. |
| 2009/0237924 A1 | 9/2009 | Ladewig |
| 2009/0280695 A1 | 11/2009 | Sekela et al. |
| 2009/0283292 A1 | 11/2009 | Lehr |
| 2009/0290343 A1 | 11/2009 | Brown et al. |
| 2010/0002320 A1 | 1/2010 | Minano et al. |
| 2010/0014282 A1 | 1/2010 | Danesh |
| 2010/0061108 A1 | 3/2010 | Zhang et al. |
| 2010/0110690 A1 | 5/2010 | Hsu et al. |
| 2010/0110698 A1 | 5/2010 | Harwood et al. |
| 2010/0110699 A1 | 5/2010 | Chou |
| 2010/0148673 A1 | 6/2010 | Stewart et al. |
| 2010/0149822 A1 | 6/2010 | Cogliano et al. |
| 2010/0165643 A1 | 7/2010 | Russo et al. |
| 2010/0244709 A1 | 9/2010 | Steiner et al. |
| 2010/0246172 A1 | 9/2010 | Liu |
| 2010/0259919 A1 | 10/2010 | Khazi et al. |
| 2010/0270903 A1 | 10/2010 | Jao et al. |
| 2010/0284185 A1 | 11/2010 | Ngai |
| 2010/0302778 A1 | 12/2010 | Dabiet et al. |
| 2011/0043040 A1 | 2/2011 | Porter et al. |
| 2011/0063831 A1 | 3/2011 | Cook |
| 2011/0068687 A1 | 3/2011 | Takahasi et al. |
| 2011/0069499 A1 | 3/2011 | Trott et al. |
| 2011/0080750 A1 | 4/2011 | Jones et al. |
| 2011/0116276 A1 | 5/2011 | Okamura et al. |
| 2011/0121756 A1 | 5/2011 | Thomas et al. |
| 2011/0134634 A1 | 6/2011 | Gingrich, III et al. |
| 2011/0134651 A1 | 6/2011 | Berman |
| 2011/0140633 A1 | 6/2011 | Archenhold |
| 2011/0170294 A1 | 7/2011 | Mier-Langner et al. |
| 2011/0194299 A1 | 8/2011 | Crooks et al. |
| 2011/0216534 A1 | 9/2011 | Tickner et al. |
| 2011/0226919 A1* | 9/2011 | Fryzek .............. F21S 8/026 248/298.1 |
| 2011/0255292 A1 | 10/2011 | Shen |
| 2011/0267828 A1 | 11/2011 | Bazydola et al. |
| 2011/0285314 A1 | 11/2011 | Carney et al. |
| 2012/0020104 A1 | 1/2012 | Biebl et al. |
| 2012/0074852 A1 | 3/2012 | Delnoij |
| 2012/0106176 A1 | 5/2012 | Lopez et al. |
| 2012/0113642 A1 | 5/2012 | Catalano |
| 2012/0140442 A1 | 6/2012 | Woo et al. |
| 2012/0162994 A1 | 6/2012 | Wasniewski et al. |
| 2012/0182744 A1 | 7/2012 | Santiago et al. |
| 2012/0188762 A1 | 7/2012 | Joung et al. |
| 2012/0243237 A1 | 9/2012 | Toda et al. |
| 2012/0266449 A1 | 10/2012 | Krupa |
| 2012/0268688 A1 | 10/2012 | Sato et al. |
| 2012/0287625 A1 | 11/2012 | Macwan et al. |
| 2012/0305868 A1 | 12/2012 | Callahan et al. |
| 2013/0009552 A1 | 1/2013 | Page |
| 2013/0010476 A1 | 1/2013 | Pickard et al. |
| 2013/0016864 A1 | 1/2013 | Ivey et al. |
| 2013/0033872 A1 | 2/2013 | Randolph et al. |
| 2013/0051012 A1 | 2/2013 | Oehle et al. |
| 2013/0141913 A1 | 6/2013 | Sachsenweger |
| 2013/0155681 A1 | 6/2013 | Nall et al. |
| 2013/0163254 A1 | 6/2013 | Chang et al. |

(56) References Cited

U.S. PATENT DOCUMENTS

| | | |
|---|---|---|
| 2013/0170232 A1 | 7/2013 | Park et al. |
| 2013/0170233 A1 | 7/2013 | Nezu et al. |
| 2013/0227908 A1 | 9/2013 | Gulbrandsen et al. |
| 2013/0258677 A1 | 10/2013 | Fryzek et al. |
| 2013/0265750 A1 | 10/2013 | Pickard et al. |
| 2013/0271989 A1 | 10/2013 | Hussell et al. |
| 2013/0294084 A1 | 11/2013 | Kathawate et al. |
| 2013/0301252 A1 | 11/2013 | Hussell et al. |
| 2013/0322062 A1 | 12/2013 | Danesh |
| 2013/0322084 A1 | 12/2013 | Ebisawa |
| 2013/0335980 A1 | 12/2013 | Nakasuji et al. |
| 2014/0036497 A1 | 2/2014 | Hussell et al. |
| 2014/0049957 A1 | 2/2014 | Goelz et al. |
| 2014/0063776 A1 | 3/2014 | Clark et al. |
| 2014/0071679 A1 | 3/2014 | Booth |
| 2014/0071687 A1 | 3/2014 | Tickner et al. |
| 2014/0140490 A1 | 5/2014 | Roberts et al. |
| 2014/0063818 A1 | 6/2014 | Randolph et al. |
| 2014/0233246 A1 | 8/2014 | Lafreniere et al. |
| 2014/0254177 A1 | 9/2014 | Danesh |
| 2014/0268836 A1 | 9/2014 | Thompson |
| 2014/0268869 A1 | 9/2014 | Blessitt et al. |
| 2014/0299730 A1 | 10/2014 | Green et al. |
| 2014/0313775 A1 | 10/2014 | Myers et al. |
| 2014/0321122 A1 | 10/2014 | Domagala et al. |
| 2014/0347848 A1 | 11/2014 | Pisavadia et al. |
| 2015/0009676 A1 | 1/2015 | Danesh |
| 2015/0029732 A1 | 1/2015 | Hatch |
| 2015/0078008 A1 | 3/2015 | He |
| 2015/0138779 A1 | 5/2015 | Livesay et al. |
| 2015/0176823 A1 | 6/2015 | Leshniak et al. |
| 2015/0184837 A1 | 7/2015 | Zhang et al. |
| 2015/0198324 A1 | 7/2015 | O'Brien et al. |
| 2015/0204491 A1 | 7/2015 | Yuan et al. |
| 2015/0219317 A1 | 8/2015 | Gatof et al. |
| 2015/0233556 A1 | 8/2015 | Danesh |
| 2015/0241039 A1 | 8/2015 | Fryzek |
| 2015/0263497 A1 | 9/2015 | Korcz et al. |
| 2015/0276185 A1 | 10/2015 | Bailey et al. |
| 2015/0308662 A1 | 10/2015 | Vice et al. |
| 2015/0345761 A1 | 12/2015 | Lawlor |
| 2015/0362159 A1 | 12/2015 | Ludyjan |
| 2016/0084488 A1 | 3/2016 | Wu et al. |
| 2016/0209007 A1 | 7/2016 | Belmonte et al. |
| 2016/0238225 A1 | 8/2016 | Doust |
| 2016/0308342 A1 | 10/2016 | Witherbee et al. |
| 2016/0312987 A1 | 10/2016 | Danesh |
| 2016/0348860 A1 | 12/2016 | Bailey et al. |
| 2016/0348861 A1 | 12/2016 | Bailey et al. |
| 2016/0366738 A1 | 12/2016 | Boulanger et al. |
| 2017/0003007 A1 | 1/2017 | Wronski |
| 2017/0045213 A1 | 2/2017 | Williams et al. |
| 2017/0059135 A1 | 3/2017 | Jones |
| 2017/0138576 A1 | 5/2017 | Peng et al. |
| 2017/0138581 A1 | 5/2017 | Doust |
| 2017/0167672 A1 | 6/2017 | Stauner et al. |
| 2017/0167699 A1 | 6/2017 | Schubert et al. |
| 2017/0198896 A1 | 7/2017 | May |
| 2017/0307188 A1 | 10/2017 | Oudina et al. |
| 2018/0112857 A1 | 4/2018 | Wronski et al. |
| 2018/0142871 A1 | 5/2018 | Morales |
| 2018/0216809 A1 | 8/2018 | Cohen |
| 2018/0224095 A1 | 8/2018 | Cohen |
| 2018/0283677 A1 | 10/2018 | Cohen |
| 2019/0032874 A1 | 1/2019 | Bonnetto et al. |
| 2019/0041050 A1 | 2/2019 | Cairns et al. |
| 2019/0049080 A1 | 2/2019 | Danesh |
| 2019/0063701 A1 | 2/2019 | Lotfi et al. |
| 2019/0093836 A1 | 3/2019 | Danesh |
| 2020/0182420 A1 | 6/2020 | Cohen et al. |

FOREIGN PATENT DOCUMENTS

| | | |
|---|---|---|
| CA | 2691480 C | 4/2012 |
| CA | 2734369 A1 | 10/2013 |
| CA | 2561459 A1 | 11/2013 |
| CA | 2815067 | 11/2013 |
| CA | 2848289 A1 | 10/2014 |
| CA | 2998173 | 7/2018 |
| CN | 2182475 Y | 11/1994 |
| CN | 201059503 Y | 5/2008 |
| CN | 201259125 Y | 6/2009 |
| CN | 101608781 A | 12/2009 |
| CN | 201636626 U | 11/2010 |
| CN | 102062373 A | 5/2011 |
| CN | 202014067 U | 10/2011 |
| CN | 202392473 U | 8/2012 |
| CN | 202733693 U | 2/2013 |
| CN | 103307518 A | 9/2013 |
| CN | 103322476 A | 9/2013 |
| CN | 203202661 U | 9/2013 |
| CN | 203215483 U | 9/2013 |
| CN | 101498411 B | 11/2013 |
| CN | 203273663 U | 11/2013 |
| CN | 203297980 U | 11/2013 |
| CN | 203628464 U | 12/2013 |
| CN | 203641919 U | 6/2014 |
| CN | 204300818 U | 4/2015 |
| CN | 104654142 A | 5/2015 |
| CN | 204513161 U | 7/2015 |
| CN | 204611541 U | 9/2015 |
| CN | 204786225 U | 11/2015 |
| CN | 204829578 U | 12/2015 |
| CN | 103712135 B | 4/2016 |
| CN | 205606362 U | 9/2016 |
| CN | 206130742 U | 4/2017 |
| CN | 103154606 B | 5/2017 |
| CN | 206222112 U | 6/2017 |
| CN | 107013845 A | 8/2017 |
| CN | 107084343 A | 8/2017 |
| DE | 9109828 U1 | 2/1992 |
| DE | 199 47 208 | 5/2001 |
| EP | 1 589 289 | 10/2005 |
| EP | 1 672 155 A1 | 6/2006 |
| EP | 1688663 | 8/2006 |
| EP | 2 095 938 A1 | 2/2008 |
| EP | 2 306 072 A1 | 4/2011 |
| EP | 2 453 169 A2 | 5/2012 |
| EP | 2 193 309 B1 | 7/2012 |
| EP | 2 735 787 A1 | 5/2014 |
| EP | 3 104 024 A1 | 12/2016 |
| GB | 2325728 | 12/1998 |
| GB | 2466875 | 7/2010 |
| GB | 2471929 | 1/2014 |
| GB | 2509772 A | 7/2014 |
| JP | H02113002 U | 9/1990 |
| JP | 2007091052 A | 4/2007 |
| JP | 2007265961 A | 10/2007 |
| JP | 2011060450 A2 | 3/2011 |
| JP | 2012064551 A2 | 3/2012 |
| JP | 2015002027 A2 | 1/2015 |
| JP | 2015002028 A2 | 1/2015 |
| JP | 2016219335 A | 12/2016 |
| JP | 2017107699 A2 | 6/2017 |
| KR | 1020110008796 A | 1/2011 |
| KR | 1020120061625 A | 6/2012 |
| MX | 2011002947 A | 9/2011 |
| TW | 474382 U | 1/2002 |
| WO | WO 2013/128896 A1 | 9/2013 |
| WO | WO 2015/000212 A1 | 1/2015 |
| WO | WO 2016152166 A2 | 9/2016 |

OTHER PUBLICATIONS

U.S. Appl. No. 15/688,266, filed Aug. 28, 2017, Lofti et al.
U.S. Appl. No. 15/853,400, filed Dec. 22, 2017, Kashani.
U.S. Appl. No. 15/901,738, filed Feb. 21, 2018, Danesh.
U.S. Appl. No. 15/947,065, filed Apr. 6, 2018, Danesh.
U.S. Appl. No. 16/016,040, filed Jun. 22, 2018, Danesh.
U.S. Appl. No. 16/200,393, filed Nov. 26, 2018, Danesh.
U.S. Appl. No. 29/638,259, filed Feb. 26, 2018, Danesh.
U.S. Appl. No. 29/541,565, filed Oct. 5, 2015, Peng.
U.S. Appl. No. 29/645,941, filed Apr. 30, 2018, Danesh et al.

(56) References Cited

OTHER PUBLICATIONS

U.S. Appl. No. 29/653,142, filed Jun. 11, 2018, Danesh et al.
U.S. Appl. No. 29/664,471, filed Sep. 25, 2018, Danesh et al.
U.S. Appl. No. 29/678,478, filed Jan. 29, 2019, Danesh et al.
U.S. Appl. No. 29/678,482, filed Jan. 29, 2019, Danesh et al.
U.S. Appl. No. 29/683,730, filed Mar. 15, 2019, Danesh et al.
U.S. Appl. No. 29/694,475, filed Jun. 11, 2019, Peng et al.
U.S. Appl. No. 16/653,497, filed Oct. 15, 2019, Danesh et al.
U.S. Appl. No. 29/711,198, filed Nov. 29, 2019, Danesh et al.
U.S. Appl. No. 16/690,970, filed Nov. 21, 2019, Nikooyan et al.
U.S. Appl. No. 16/719,361, filed Dec. 18, 2019, Danesh et al.
U.S. Appl. No. 16/522,275, filed Jul. 25, 201, Danesh.
U.S. Appl. No. 16/725,606, filed Dec. 23, 2019, Bailey et al.
U.S. Appl. No. 29/648,046, filed May 17, 2018, Williams.
U.S. Appl. No. 16/779,824, filed Feb. 3, 2020, Danesh.
U.S. Appl. No. 16/779,865, filed Feb. 3, 2020, Danesh et al.
2006 International Building Code, Section 712 Penetrations, Jan. 2006, 4 pages.
Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
Bortz, J. C. et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.
BXUV.GuideInfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.
Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Carlon® Zip Box® Blue™ Switch and Outlet Boxes, Product Brochure, http://www.carlonsales.com/brochures.php, Jun. 20, 2006, 22 pages.
Cree LED Lamp Family Sales Sheet—Better light is beautiful light, Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action dated Apr. 27, 2016 from U.S. Appl. No. 14/184,601, 19 pages.
Final Office Action dated Jul. 26, 2017 from U.S. Appl. No. 14/184,601, 18 pages.
Final Office Action dated Jan. 29, 2016 from U.S. Appl. No. 14/183,424, 21 pages.
Final Office Action dated Jun. 23, 2016 from U.S. Appl. No. 13/484,901, 18 pages.
Final Office Action dated Apr. 2, 2015 from U.S. Appl. No. 13/484,901, 13 pages.
HALO, HALO LED H4 H7 Collection, SustainabLEDesign, Cooper Lighting, (emphasis on p. 18 "H7 Collection LED Modules—Halo LED H7 Module Features,") Mar. 28, 2012, 52 pages.
HALO, H7 LED Downlight Trims 49x Series, 6-inch LED Trims for Use with MI7x LED Modules, Cooper Lighting, ADV110422, rev. Aug. 12, 2011, 15 pages.
HALO, LED Module ML706x, Cooper Lighting, General Installation for All Modules/p. 1; Tether Installation/pp. 2-3; Installation into HALO H750x Series LED—only (Non-Screw Based), Recessed Fixture, p. 4, Oct. 20, 2009, 4 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title p. Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance dated Mar. 26, 2018 for U.S. Appl. No. 14/184,601, 10 pages.
Non-Final Office Action dated Mar. 15, 2010 from U.S. Appl. No. 12/100,148, 8 pages.
Non-Final Office Action dated Apr. 30, 2010 from U.S. Appl. No. 12/173,232, 13 pages.
Non-Final Office Action dated Sep. 5, 2014 from U.S. Appl. No. 13/791,087, 8 pages.
Non-Final Office Action dated Jul. 20, 2015 from U.S. Appl. No. 14/184,601, 16 pages.
Non-Final Office Action dated Dec. 15, 2016 from U.S. Appl. No. 14/184,601, 18 pages.
Non-Final Office Action dated Feb. 6, 2018 from U.S. Appl. No. 15/167,682, 9 pages.
Non-Final Office Action dated Sep. 15, 2015 from U.S. Appl. No. 13/484,901, 16 pages.
Non-Final Office Action dated Oct. 16, 2014 from U.S. Appl. No. 13/484,901, 11 pages.
Non-Final Office Action dated Sep. 6, 2017 from U.S. Appl. No. 14/726,064, 8 pages.
Non-Final Office Action dated May 17, 2017 from U.S. Appl. No. 14/183,424, 20 pages.
Non-Final Office Action dated Jun. 2, 2015 from U.S. Appl. No. 14/183,424, 20 pages.
Non-Final Office Action dated Apr. 12, 2018 for U.S. Appl. No. 29/638,259, 5 pages.
Non-Final Office Action dated May 16, 2018 for U.S. Appl. No. 15/132,875, 18 pages.
Notice of Allowance dated Jan. 30, 2015 from U.S. Appl. No. 13/791,087, 9 pages.
Notice of Allowance dated Jan. 16, 2015 from U.S. Appl. No. 29/467,026, 9 pages.
Notice of Allowance dated Oct. 21, 2016 from U.S. Appl. No. 13/484,901, 7 pages.
Notice of Allowance dated Mar. 24, 2016 from U.S. Appl. No. 14/247,149, 8 pages.
Notice of Allowance dated May 22, 2018 from U.S. Appl. No. 14/183,424, 9 pages.
Notice of Allowance dated May 10, 2018 from U.S. Appl. No. 14/726,064, 7 pages.
Notice of Allowance dated Aug. 23, 2017 from Canadian Application No. 2,879,629, 1 page.
"Outlet Boxes for Use in Fire Rated Assemblies," https://www.ul.com/wp-content/uploads/2014/04/Ul_outletboxes.pdf, Apr. 2007, 2 pages.

(56) References Cited

OTHER PUBLICATIONS

Parkyn, W. A. et al., "New TIR lens applications for light-emitting diodes", Proc. SPIE 3139, Nonimaging Optics: Maximum Efficiency Light Transfer IV, (Oct. 3, 1997); doi: 10.1117/12.290217, 7 pages.
Schreiber, P. et al., "Microoptics for homogeneous LED-illumination", Proc. SPIE 6196, Photonics in Multimedia, 61960P (Apr. 21, 2006); doi: 10.1117/12.663084; https://doi.org/10.1117/12.663084, 11 pages.
Van Giel, B. V. et al., "Design of axisymmetrical tailored concentrators for LED light source applications", Proc. SPIE 6196, Photonics in Multimedia, 619603 (Apr. 21, 2006); doi: 10.1117/12.660115; https://doi.org/10.1117/12.660115, 11 pages.
Zhen, Y. et al., "The optimal design of TIR lens for improving LED illumination uniformity and efficiency", Proc. SPIE 6834, Optical Design and Testing III, 68342K (Nov. 28, 2007); doi: 10.1117/12.756101, 9 pages.
Zou, H. et al., "58.1: Single-Panel LCOS Color Projector with LED Light Sources", SID Symposium, vol. 36, Issue 1, 4 pages (May 2005).
Notice of Allowance dated Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed at http://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," ELCO Lighting. Sep. 2018. 1 page.
"LED Undercabinet Pocket Guide," ELCO Lighting. Nov. 2, 2016. 12 pages.
"Versi LED Mini Flush," Lithonia Lghting. Sep. 2013. 6 pages.
Notice of Allowance dated Oct. 4, 2018 from U.S. Appl. No. 15/947,065 , 9 pages.
Notice of Allowance dated Sep. 19, 2018 from U.S. Appl. No. 15/167,682 , 7 pages.
Non-Final Office Action dated Jun. 25, 2018 for U.S. Appl. No. 29/541,565, 10 pages.
Non-Final Office Action dated Oct. 24, 2018 for U.S. Appl. No. 15/688,266, 14 pages.
OneFrame Recessed LED Downlight. Dmflighting.com. Published Jun. 6, 2018. Retrieved at https://www.dmflighting.com/productioneframe on Jun. 6, 2018. 11 pages.
Notice of Allowance dated Oct. 9, 2018 from U.S. Appl. No. 29/653,142, 7 pages.
International Search Report and Written Opinion in PCT/US2018/048357 dated Nov. 14, 2018, 13 pages.
Notice of Allowance dated Nov. 27,2018 from U.S. Appl. No. 15/167,682, 11 pages.
Non-Final Office Action dated Dec. 5, 2018 from U.S. Appl. No. 14/942,937, 13 pages.
International Search Report and Written Opinion in International Patent Application No. PCT/US18/39048 dated Dec. 14, 2018. 24 pages.
Notice of Allowance dated Jan. 2, 2019 from U.S. Appl. No. 29/541,565, 6 pages.
RACO 4 in. Octagon Welded Concrete Ring, 6 in. Deep with 1/2 and 3/4 in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance dated Feb. 8, 2019 from U.S. Appl. No. 29/541,565, 5 pages.
Non-Final Office Action dated Feb. 7, 2019 from U.S. Appl. No. 16/200,393, 32 pages.
Notice of Allowance dated Jan. 28, 2019 from U.S. Appl. No. 29/664,471, 8 pages.
Final Office Action dated Mar. 15, 2019 from U.S. Appl. No. 15/132,875,15 pages.
International Search Report and Written Opinion in International Patent Application No. PCT/US18/62868 dated Mar. 14, 2019, 13 pages.
CS&E PCT Collaborative Search and Examination Pilot Upload Peer Contribution in International Patent Application No. PCT/US18/62868 dated Mar. 14, 2019, 61 pages.
Notice of Allowance dated Apr. 1, 2019 from U.S. Appl. No. 15/167,682, 7 pages.
Non-Final Office Action dated Apr. 4, 2019 from U.S. Appl. No. 29/678,482, 8 pages.
Notice of Allowance dated Apr. 8, 2019 from U.S. Appl. No. 29/653,142, 8 pages.
Notice of Allowance dated Apr. 17, 2019 from U.S. Appl. No. 29/678,478, 7 pages.
International Search Report and Written Opinion in International Patent Application No. PCT/US18/67614 dated Apr. 25, 2019, 20 pages.
CS&E PCT Collaborative Search and Examination Pilot Upload Peer Contribution in International Patent Application No. PCT/US18/67614 dated Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action dated Jun. 6, 2019 from U.S. Appl. No. 15/688,266, 7 pages.
Non-Final Office Action dated Jun. 11, 2019 from U.S. Appl. No. 15/901,738, 6 pages.
Notice of Allowance dated Jun. 12, 2019 from U.S. Appl. No. 16/016,040, 8 pages.
Cooper Lighting HALO ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
KWIKBRACE® New Construction Braces for Lighting Fixtures or Ceiling Fans 1-1/2 in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance dated Jul. 31, 2019 from U.S. Appl. No. 15/167,682 , 7 pages.
Supplemental Notice of Allowance dated Aug. 5, 2019 from U.S. Appl. No. 15/947,065, 2 pages.
International Search Report and Written Opinion in International Patent Application No. PCT/US19/32281 dated Aug. 2, 2019, 18 pages.
Notice of Allowance dated Sep. 11, 2019 from U.S. Appl. No. 29/653,142, 6 pages.
Notice of Allowance dated Sep. 19, 2019 from U.S. Appl. No. 16/016,040, 7 pages.
Corrected Notice of Allowance dated Sep. 27, 2019 from U.S. Appl. No. 15/167,682 , 2 pages.
Final Office Action dated Sep. 27, 2019 from U.S. Appl. No. 16/200,393, 34 pages.
Notice of Allowance dated Feb. 15, 2019 from U.S. Appl. No. 15/947,065 , 9 pages.

(56) References Cited

OTHER PUBLICATIONS

Notice of Allowance dated Oct. 1, 2019 from U.S. Appl. No. 14/942,937, 7 pages.
Final Office Action dated Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Corrected Notice of Allowance dated Oct. 10, 2019 from U.S. Appl. No. 16/016,040, 2 pages.
Cree® LMR2 LED Module. Product Family Data Sheet Cree 2011. 3 pages.
Notice of Allowance dated Oct. 16, 2019 from U.S. Appl. No. 15/132,875, 12 pages.
International Search Report and Written Opinion in International Patent Application No. PCT/US2019/036477 dated Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Non-Final Office Action dated Dec. 30, 2019 from U.S. Appl. No. 16/653,497, 8 pages.
Notice of Allowance dated Feb. 5, 2020 from U.S. Appl. No. 15/901,738 , 8 pages.
Notice of Allowance dated Feb. 5, 2020 from U.S. Appl. No. 29/678,482 , 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 dated Feb. 24, 2020, 23 pages.
Final Office Action dated Mar. 17, 2020 for U.S. Appl. No. 29/653,142, 13 pages.
LED Book Pr ice Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" Dle Series LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action dated Apr. 2, 2020 for U.S. Appl. No. 16/522,275, 21 pages.

Notice of Allowance dated May 18, 2020 from U.S. Appl. No. 15/901,738 , 7 pages.
Non-Final Office Action dated May 20, 2020 for U.S. Appl. No. 15/688,266, 6 pages.
Non-Final Office Action dated May 26, 2020 for U.S. Appl. No. 16/719,361, 10 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("The '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog— Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) (Lighting Handbook). 5 pages.
IPR2019-01094 Exhibit 1014. California Energy Commission, PIER Lighting Research Program: Project 2.3 Low-profile LED Luminaires Final Report (Prepared by Lighting Research Center, Jan. 2005) ("PIER LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, LUXEON Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.

(56) References Cited

OTHER PUBLICATIONS

IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting Research and Development: Multi-Year Program Plan (Apr. 2013) ("DOE 2013"). 89 pages.
Declaration of Colby Chevalier from Central District of California Civil Docket for Case#: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navegator *AMP Plus, Inc. d/b/a Elco Lighting* et al v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting* et al v. *DMF, Inc.* PTAB-IPR2019-01500. Downloaded Mar. 25, 2020. 3 pages.
Civil Action No. 2:18-cv-07090. Complaint for Infringement and Unfair Competition. *DMF, Inc.* v. *AMP Plus, Inc. d/b/a ELCO Lighting.* 52 pages. Dated Aug. 15, 2018.
Docket Listing in Civil Action No. 2:18-cv-07090. *DMF, Inc.* v. *AMP Plus, Inc. d/b/a ELCO Lighting* et al CDCA-2-18-cv-07090. Downloaded on Mar. 25, 2020. 39 pages.
Civil Action No. 2:19-cv-4519.Complaint for Patent Infringement. *DMF, Inc.* v. *AMP Plus, Inc. d/b/a Elco Lighting.* 52 pages dated May 22, 2019. 23 pages.
Docket Listing in Civil Action no. 2:19-cv-4519. *DMF Inc* v. *AMP Plus, Inc. d/b/a ELCO Lighting* et al CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D in Support of AMP Plus, Inc.'s Opposition to DMF, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya in Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. Eye LEDs Specification Sheet 2012. 2 pages.
HiBay LED Heat Sink. Wakefield-vette. Dec. 11, 2017.1 pages.
Thermal Management of Cree® XLamp® LEDs. Cree Application Note. 2004. 19 pages.
Imtra Marine Lighting Fall 2007 Catalog. 32 pages.
RACO 4 i+A882:C958n. Octagon Welded Concrete Ring, 3-1/2 in. Deep with 1/2 and 3/4 in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
Maxim Lighting International, "Wafer LED 7" RD 3000K Wall/Flush Mount", undated.
Maxim Lighting International, "Convert LED Flush Mount", undated.
Maxim Lighting International, "Views of the Wafer Flush Mount", undated.
Maxim Lighting International, "Product/Drawing Specification Sheet", undated.
International Search Report and Written Opinion in PCT/US2020/017331 dated Jun. 22,2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. :: 20870LEDD-WH/ACR Infinite Specification Sheet. Access Lighting. Apr. 9, 2020. 1 page.
Notice of Allowance dated Apr. 9, 2020 from U.S. Appl. No. 16/653,497, 7 pages.
Notice of Allowance dated Jul. 10, 2020 from U.S. Appl. No. 29/694,475, 6 pages.
Corrected Notice of Allowability dated Oct. 25, 2018 from U.S. Appl. No. 14/183,424, 3 pages.
dmf DRD2 Recessed LED Downlight General Retrofit Junction Box Dated: Dec. 18, 2015 Downloaded Jul. 28, 2018, from https://www.a lconlighting.com/specsheets/DMF/DRD2-Junction-Box-Retrofit-Spec-Sheet .pdf, 6 pages.
dmf DRD2 Recessed LED Downlight General New Construction 4", 5", 6" Aperture Dated: Aug. 31, 2016 Downloaded Jul. 28, 2018, from https://www. cansandfans.com/sites/default/files/DRD2-General-New-Construction-Spec-Sheet_7_0 .pdf , 9 pages.
Mar 5, 2016—The DMF Lighting DRD2 Recessed LED Downlight General Retrofit Junction Box—Wet Location Rated is the ideal solution for Commercial LED recessed lighting retrofit applications. web cache https://ww w.alconlighting.com/dmf-drd2m.html (downloaded Jul. 28, 2018), 6 pages.
Ex Parte Quayle Office Action dated Oct. 16, 2018 for U.S. Appl. No. 29/663,037, 7 pages.
Notice of Allowance dated Nov. 19, 2018 from U.S. Appl. No. 29/663,037, 5 pages.
Notice of Allowance dated Nov. 15, 2018 from U.S. Appl. No. 29/663,040, 5 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Notice of Allowance dated Jul. 20, 2020 from U.S. Appl. No. 29/648,046, 5 pages.
Octagon Concrete Box Cover with (3) 1/2 in. & (2) 3/4 in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUlypJc0K80UHdDTI9C5m4BDzR3U87PRYV1NdQIBFxEWQ2l_3otTCTqEkaAi_DEALw_wcB on Jul. 20, 2020. 1 page.
Notice of Allowance dated Jul. 28, 2020 from U.S. Appl. No. 16/719,361, 8 pages.
Notice of Allowance dated Jul. 29, 2020 from U.S. Appl. No. 16/522,275, 8 pages.
Notice of Allowance dated Sep. 8, 2020 from U.S. Appl. No. 29/678,482, 5 pages.
Corrected Notice of Allowance dated Sep. 11, 2020 from U.S. Appl. No. 16/719,361, 2 pages.
Canadian Office Action in Application No. 2931588 dated Aug. 13, 2020, 5 pages.
Corrected Notice of Allowance dated Sep. 14, 2020 from U.S. Appl. No. 16/522,275, 2 pages.
Notice of Allowance dated Sep. 22, 2020 from U.S. Appl. No. 29/683,730, 6 pages.

(56) References Cited

OTHER PUBLICATIONS

Notice of Allowance dated Sep. 22, 2020 from U.S. Appl. No. 29/653,142, 6 pages.
Notice of Allowance dated Oct. 27, 2020 from U.S. Appl. No. 29/648,046, 5 pages.
Notice of Allowance dated Oct. 27, 2020 from U.S. Appl. No. 29/694,475, 5 pages.
Notice of Allowance dated Nov. 10, 2020 from U.S. Appl. No. 29/688,143, 6 pages.
Notice of Allowance dated Nov. 10, 2020 from U.S. Appl. No. 29/688,172, 6 pages.
Non-Final Office Action dated Nov. 30, 2020 from U.S. Appl. No. 17/000,702, 7 pages.
Notice of Allowance dated Dec. 2, 2020 from U.S. Appl. No. 29/746,262, 6 pages.
International Search Report and Written Opinion in PCT/US2020/050767 dated Dec. 9, 2020, 25 pages.
Non-Final Office Action dated Dec. 16, 2020 from U.S. Appl. No. 17/080,080, 28 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages.
Final Written Decision in IPR2019-01094 dated Nov. 19, 2020, 58 pages.
Request for Ex Parte Reexamination of U.S. Pat. No. 10,663,127 filed Aug. 3, 2020, Reexam Control No. 90/014,557, 48 pages.
Notice of Streamlined Reexamination Request Filing Date in Reexam Control No. 90/014,557 dated Aug. 5, 2020, 2 page.
Ex Parte Reexamination Interview Summary in Reexam Control No. 90/014,557 dated Aug. 17, 2020, 3 pages.
DRD5S Surface Mount LED Downlight Vimeo Mar. 28, 2018. Accessed at https://vimeo.com/262251260.4 pages.
Order Granting Request for Ex Parte Reexamination in Reexam Control No. 90/014,557 dated Aug. 25, 2020, 10 pages.
Request for Ex Parte Reexamination of U.S. Pat. No. 10,488,000 filed Oct. 30, 2020, Reexam Control No. 90/014,601, 27 pages.
Notice of Streamlined Reexamination Request Filing Date in Reexam Control No. 90/014,601 dated Nov. 4, 2020, 2 pages.
Order Granting Request for Ex Parte Reexamination in Reexam Control No. 90/014,601 dated Nov. 16, 2020, 11 pages.

\* cited by examiner

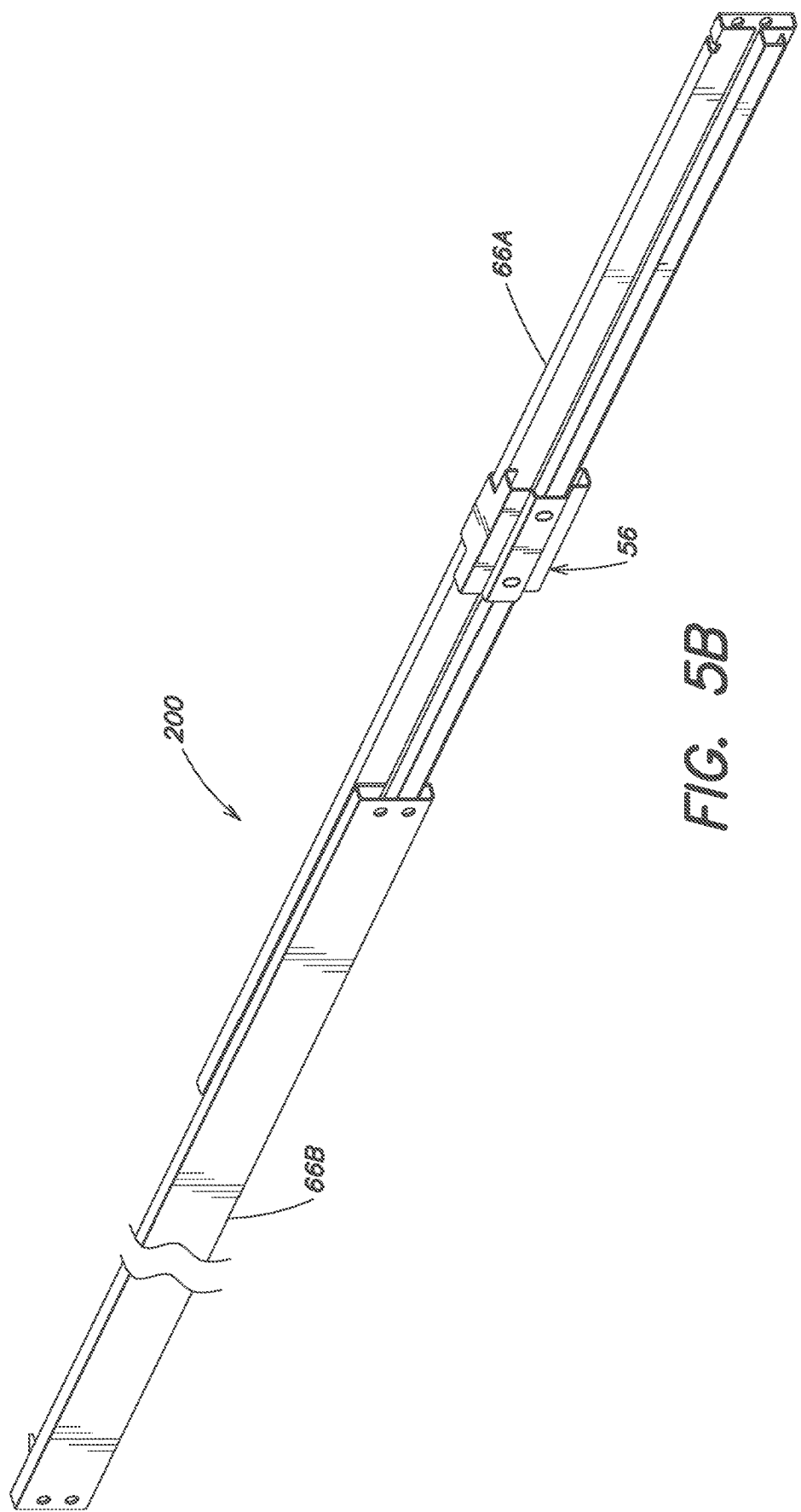

ADJUSTABLE HANGER BAR ASSEMBLY

CROSS-REFERENCE TO RELATED PATENT APPLICATION(S)

This application is a Bypass Continuation Application of International Application PCT/US2018/062868 entitled "ADJUSTABLE HANGER BAR ASSEMBLY," filed Nov. 28, 2018, the disclosure of which is incorporated herein by reference in its entirety.

International Application PCT/US2018/062868 claims priority to U.S. provisional application Ser. No. 62/591,594, filed Nov. 28, 2017, entitled ADJUSTABLE HANGER BAR ASSEMBLY FOR LIGHTING APPARATUS, which is incorporated by reference herein in their entirety.

BACKGROUND

Recessed lighting systems are typically installed or mounted into an opening in a ceiling or a wall. Modern recessed lighting systems generally consist of a trim, a light source module, a driver circuit, a junction box, and a set of hanger bars. The driver is insulated from other portions and components of the recessed lighting system, including the light source module, through the use of insulation provided by the junction box while the light source module is housed therein. The driver is electrically coupled to the light source module through the use of wires or other conduits so that the driver can power the light source module to emit light.

The junction box, the can, and other components of the recessed lighting system are attached to the hanger bars such that the hanger bars may support the components of the recessed lighting system in a wall or ceiling of a structure. For example, the junction box may be attached to the hanger bars through the use of screws and bolts, which anchor the junction box and driver.

The inventions of commonly owned U.S. Patent Publ. No. 2015/0233506 dramatically advanced the state of the art or recessed lighting systems having such components. However, opportunities for further improvement remain.

SUMMARY

The Inventors have recognized and appreciated that a hanger bar assembly directly coupled to a housing of a lighting system, such as a junction box, a can housing, a bracket, or a luminaire frame, provides several benefits to the installation of a lighting system, such as allowing the housing to be positioned in a preferred location between adjacent support structures, such as joists or beams. The direct coupling of the hanger bar assembly to the housing of the lighting system substantially reduces the added bulk and size of traditional recessed lighting systems, which can reduce both raw material costs and shipping costs.

However, the Inventors have also recognized and appreciated several shortcomings of conventional hanger bar assemblies. For example, gaps between coupled hanger bars can lead to backlash and slop, particularly when the hanger bars are extended to cover a large distance between the adjacent support structures. Additionally, the hanger bars are typically different in size; hence, conventional hanger bar holders are designed to accommodate the larger hanger bar. If the housing is installed proximate to a support structure, the hanger bars may need to be extended such that only one hanger bar is held by the hanger bar holder. If the smaller hanger bar is held in the hanger bar holder, large gaps may form between the smaller hanger bar and the hanger bar holder, leading to instabilities in the hanger bar assembly.

The present disclosure is thus directed to various inventive hanger bar assemblies that (1) interlock the hanger bars to reduce unwanted lateral backlash and slop and (2) constrain each of the hanger bars to the hanger bar holder to reduce unwanted lateral movement between the hanger bars and the hanger bar holder.

In one example, a hanger bar assembly includes a first hanger bar having a first interlocking structure, a second hanger bar having a second interlocking structure to interlock with the first hanger bar, and a hanger bar holder to hold at least one of the first hanger bar or the second hanger bar. The second hanger bar is mechanically coupled to the first hanger bar such that the second hanger bar slides relative to the first hanger bar in a telescopic manner along a first axis. The first interlocking structure constrains lateral movement of the second hanger bar relative to the first hanger bar along a second axis, perpendicular to the first axis, and a third axis, perpendicular to the first axis and the second axis. The hanger bar holder further includes a frame comprising a first section to guide at least the first hanger bar through the hanger bar holder along the first axis and constrain lateral movement of the first hanger bar relative to the hanger bar holder along the second axis and the third axis. The frame also includes a second section to guide at least the second hanger bar through the hanger bar holder along the first axis and constrain lateral movement of the second hanger bar relative to the hanger bar holder along the second axis and the third axis. The frame also forms a passageway that partially surrounds the first hanger bar and the second hanger bar.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5B shows a perspective view of the hanger bar assembly of FIG. 4A where the first hanger bar is positioned such that the first hanger bar no longer is disposed within the hanger bar holder.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
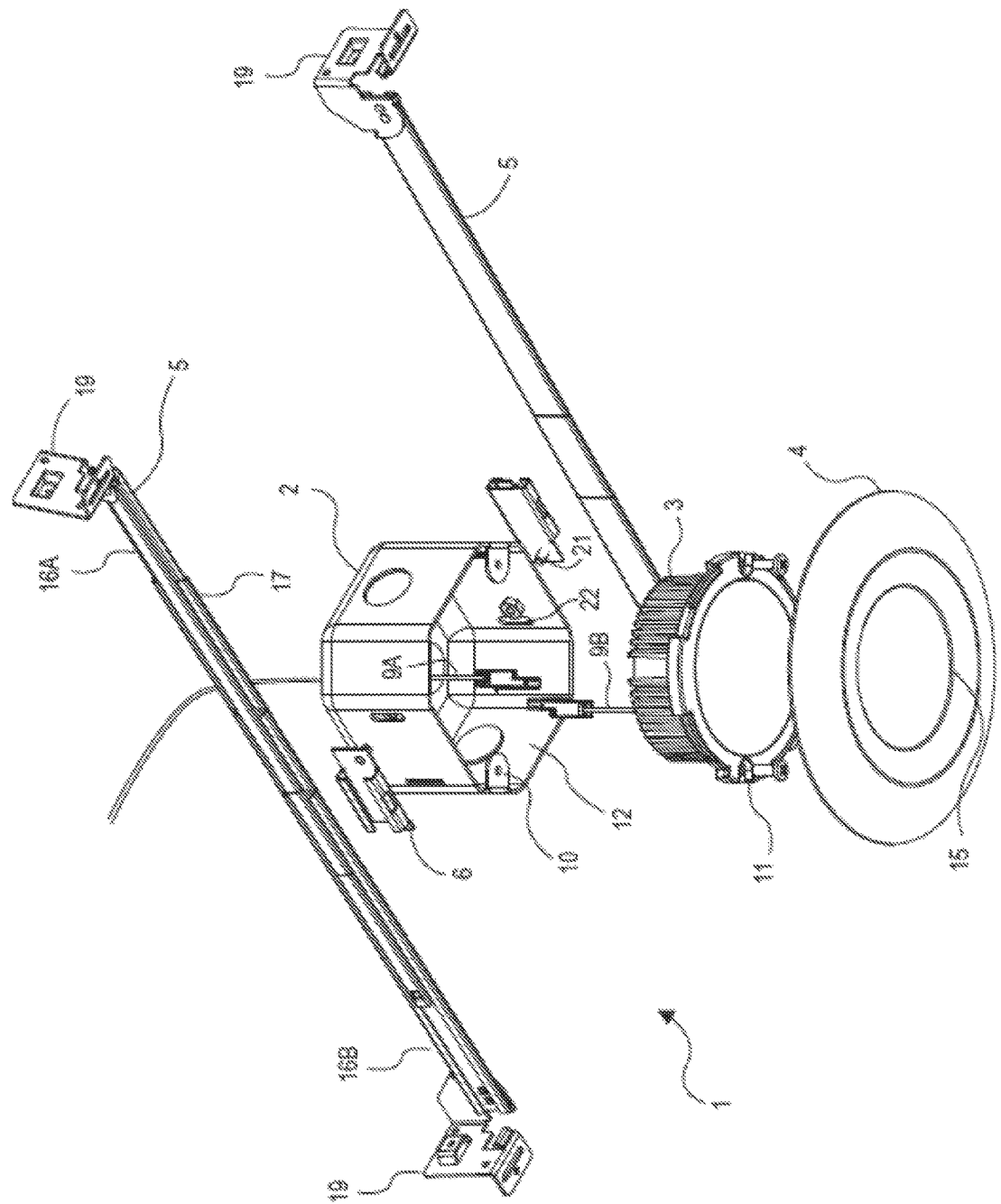
FIG. 1 shows an exploded view of a recessed lighting system according to one embodiment.

FIG. 1 shows an exploded view of an example recessed lighting system 1. The recessed lighting system 1 may include a junction box 2, a unified casting 3, a trim 4, a set of hanger bars 5, and a set of hanger holders 6. In some embodiments, the unified casting 3 may include a light source module and a driver in a single compact unit. As will be described in further detail below, the recessed lighting system 1 provides a more compact and cost effective design that allows the light source module 3 to be moved and adjusted while complying with various building and safety codes/regulations. Each of the elements of the recessed lighting system 1 will be explained by way of example below.

The junction box 2 is a structure that separates the inner components of the recessed lighting system 1, including electrical wires/cables, from the items inside a ceiling or crawl space (e.g., insulation) in which the junction box 2 has been installed. In one embodiment, the junction box 2 may be a single or double gang box with a fire rating of up to two hours as described in the National Electrical Code (NEC) and by the Underwriters Laboratories (UL). The junction box 2 may receive electrical wires 9A from an electrical system (e.g., 120 VAC or 277 VAC) within a building or structure in which the recessed lighting system 1 is installed. The electrical wires 9A from the structure may be connected to corresponding wires 9B of the unified casting 3.

Although shown in FIG. 1 as a standard "2×2" junction box, the junction box 2 may be implemented by an outer casing such as that described in co-pending U.S. Patent Publ. No. 2016/0312987, the contents of which are incorporated herein by reference in their entirety.

The casting 3 is a shell and/or enclosure that further prevents the exposure of heat from the light source module and the driver to the items inside a ceiling or crawl space (e.g., insulation) in which the recessed lighting system 1 has been installed. An example light source module and driver that can be housed in a casting 3 used in system 1 is described in more detail in co-pending U.S. Patent Publ. No. 2015/0009676, the contents of which are incorporated herein by reference in their entirety.

In one embodiment, the electrical wires 9A received by the junction box 2 from the electrical system of a building or structure may be coupled to the electrical wires 9B of the casting 3. As shown, the electrical wires 9A and 9B are connected together through the use of interlocking connectors that may be contained within the box 2 (together with the casting 3). However, in other embodiments, the electrical wires 9A may be coupled to the electrical wires 9B through the use of electrical caps or other devices, and that may be kept outside the box 2 (while the casting 3 is retained inside). The electrical wires 9B of the casting 3 may terminate in a connection with the driver 8 installed within the casting 3. When the wires 9A and 9B are connected, electricity may pass from the electrical system of the building or structure to the driver to enable the driver to power the light source module.

In one embodiment, the recessed lighting system 1 may include a trim 4. The trim 4 serves the primary purpose of covering the exposed edge of the ceiling or wall where a hole is formed in which the recessed lighting system 1 resides while still allowing light from the light source module 3 to be emitted into a room through an aperture 15. In doing so, the trim 4 helps the recessed lighting system 1 appear seamlessly integrated into the ceiling or wall. In one embodiment, the trim 4 is to be attached to the casting 3 while in other embodiments the trim 4 is to be attached to the junction box 2. The trim 4 may couple to the casting 3 and/or the junction box 2 using any connecting mechanism, including resins, clips, screws, bolts, or clamps. In one embodiment, the trim 4 may include grooves and/or slots to couple to corresponding grooves and/or slots of the casting 3 and/or the junction box 2 using a twist-and-lock friction connection and without the use of separate tools or other devices.

In one embodiment, the recessed lighting system 1 may include a set of hanger bars 5 as shown in FIG. 1. The hanger bars 5 may be rigid, elongated members that are connected between adjacent joists and/or beams in the walls or ceilings of a structure (See FIG. 2). In one embodiment, each of the hanger bars 5 may be telescoping such that each hanger bar 5 may be extended or retracted to meet the gap between the joists and/or beams. In this embodiment, each hanger bar 5 may include an inner bar element 16A and an outer bar element 16B. The inner bar element 16A may be inserted and then held inside a railing structure 17 formed on the outer bar element 16B. In this configuration, the inner bar element 16A may slide in relation to the outer bar element 16B to vary the total length of each hanger bar 5. In one embodiment, the railing structure 17 within the outer bar element 16B may be formed by a set of guides. The guides may be bent pieces of the outer bar element 16B or tabs that are coupled to the outer bar element 16B. In this fashion, the railing structure 17 forms a channel for the inner bar element 16A.

In one embodiment, each of the hanger bars 5 may include a set of mounting blocks 19. The mounting blocks 19 may be used to couple the hanger bars 5 to the joists and/or beams in the walls or ceilings of a structure. For example, as shown in FIG. 1, the mounting blocks 19 may include holes for receiving screws and/or nails or other fasteners that enable the hanger bars 5 to be securely attached to a building structure. Although shown in FIG. 1 and described above in relation to holes and screws, in other embodiments, other mechanisms of attachment may be used in conjunction with the mounting blocks 19, including resins, clips, or clamps to attached the bars 5 to the building structure. In one embodiment, the mounting blocks 19 may be integrated in one indivisible structure along with the inner bar element 16A and the outer bar element 16B, while in other embodiments, as shown in FIG. 1, the mounting blocks 19 may be coupled to the inner bar element 16A and the outer bar element 16B through the use of one or more attachment mechanisms (e.g., screws, bolts, resins, clips, or clamps). Using the above telescoping and mounting features, the recessed lighting system 1 may be installed in almost all the 2"×2" through 2"×16" wood joist constructions, metal stud constructions, and t-bar ceiling constructions.

Figure 2:
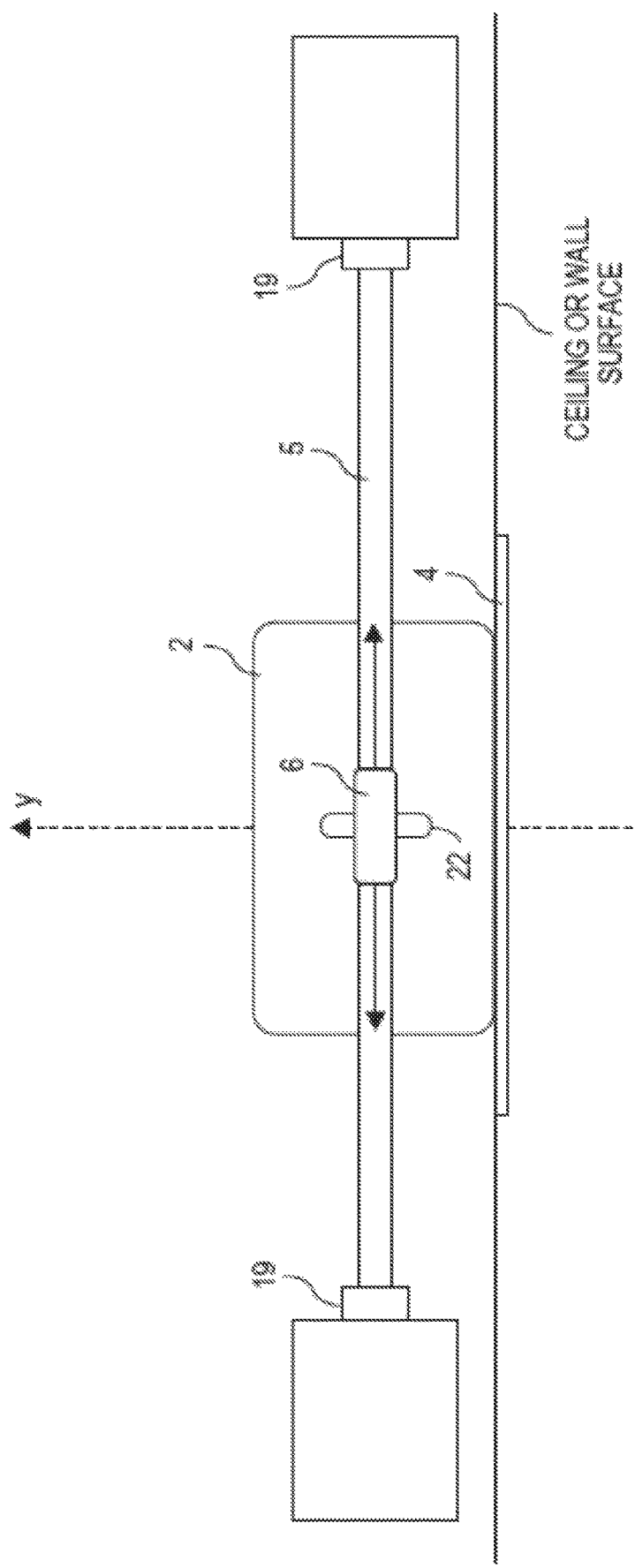
FIG. 2 shows how the junction box and hanger holders can be moved and positioned horizontally along hanger bars and vertically along the axis Y according to one embodiment.

In one embodiment, the recessed lighting system 1 may include a set of hanger holders 6. The hanger holders 6 may be configured to slide or otherwise move along corresponding hanger bars 5. In one embodiment, the hanger holders 6 may include an attachment mechanism 21 for coupling with the junction box 2. The attachment mechanism 21 may be any mechanism that allows the junction box 2 to be removably connected to the hanger bars 5. For example, as shown in FIG. 1, the attachment mechanism 21 may be a hole that is to receive a screw or bolt therein. However, in other embodiments, the attachment mechanism 21 may include resins, clips, and/or clamps that allow the hanger holders 6 to be coupled to the junction box 2. By being coupled to the hanger holders 6, the junction box 2, along with the light source module and the driver therein, may be moved across the hanger bars 5 to a desired location as shown in FIG. 2. Accordingly, during installation of the recessed lighting system 1, the hanger bars 5 may be installed inside a gap between beams within a structure by affixing the mounting blocks 19 to the beams, and then the junction box 2, along with the light source module 7 and the driver 8 therein, may be moved by the installer to a desired location along the hanger bars 5 and within the gap.

According to certain aspects, the hanger holders 6 described above allow the junction box 2 to be moved in a direction parallel to a longitudinal axis of the hanger bars 5. Accordingly, the junction box 2 may be moved to a preferred location between a set of joists or beams in a structure before being locked into position using the mechanism 21. By being configured such that the junction box 2, along with the light source module and the driver therein, is coupled to a unified set of moveable elements that assist in positioning the combined structure, the recessed lighting system 1 eliminates the added bulk and size of traditional recessed lighting systems. This compact design provides an affordable design by cutting the cost of raw materials and other components and reduces shipping costs by reducing bulk.

Although the hangar bars 5 and hanger holders 6 described in connection with the lighting system 1 above provide many advantages over traditional recessed lighting systems, the present applicant has recognized that certain opportunities for improvement still exist.

Figure 3:
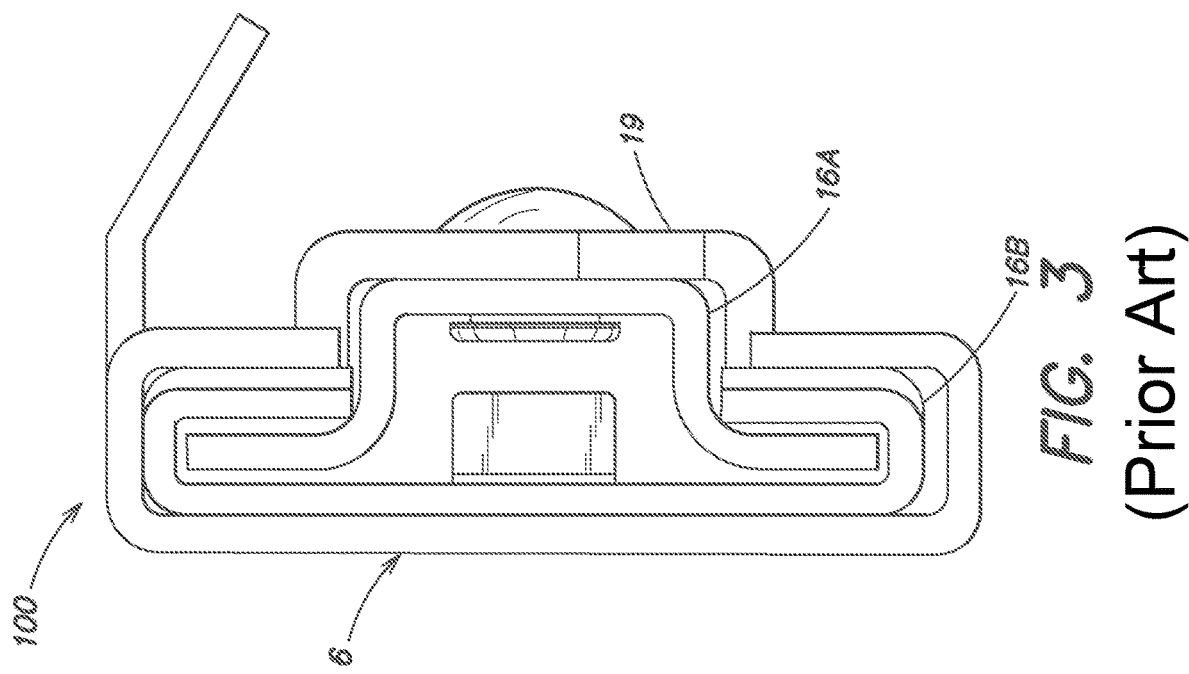
FIG. 3 is a front view of a hanger bar assembly with a pair of hanger bars and a hanger bar holder.

For example, FIG. 3 is a front view of an exemplary hanger bar assembly 100 of hanger bars 5 and a hanger holder 6 such as those components illustrated in FIGS. 1 and 2. As described above, and as shown in FIG. 3, hanger bars 5 and hanger holders 6 are made in a way that one of the bars 16B slides telescopically over the other bar 16A to adjust to a variety of joist spacings. The holder 6 is normally made to cover the larger of the two pieces (16B) to allow the lateral motion of the junction box (not shown). When the joist spacing is large (for example, larger than 16 inches), any gap between the sliding pieces 16A, 16B creates a vertical backlash and slop in the junction box. Also, if the junction box has to be installed close to a joist, and the holder 6 is therefore located only on one of the pieces such as 16A due to the telescopic extension between pieces 16A and 16B, there would be a large gap between hanger bar 5 and holder 6 at piece 16A, which would lead to instability.

Figure 4A:
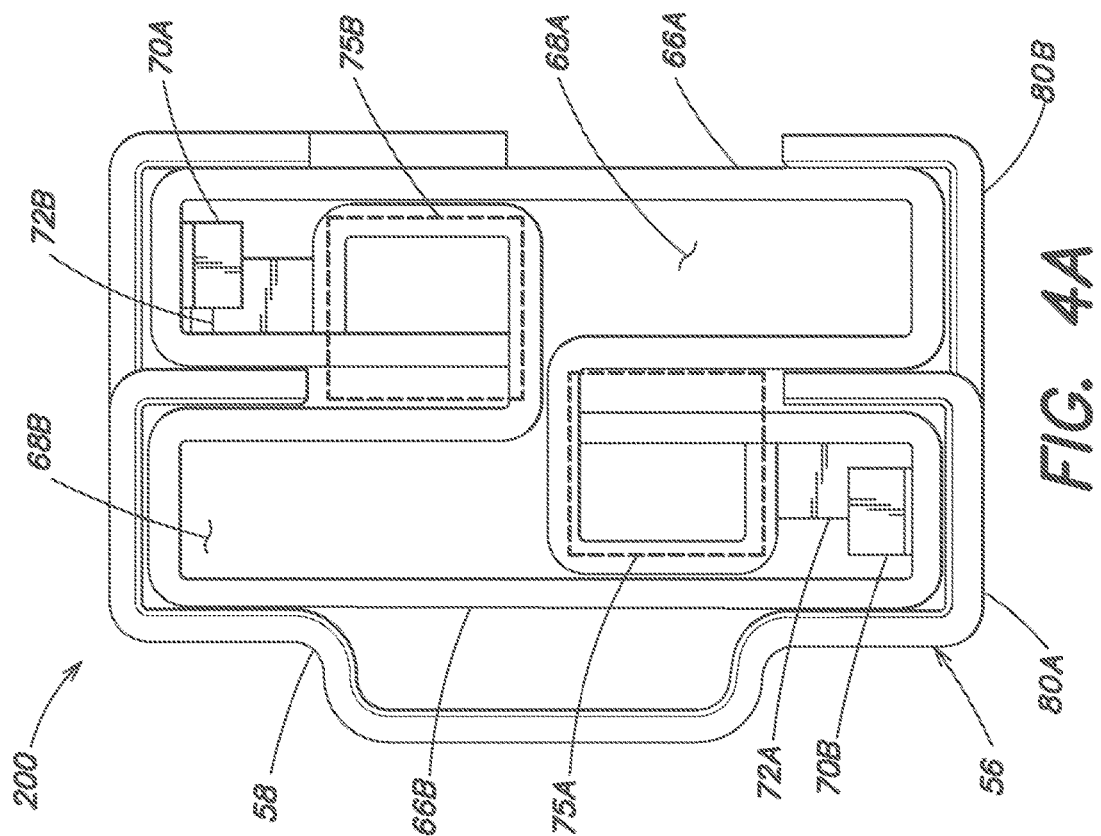
FIG. 4A is a front view of another exemplary hanger bar assembly with a pair of hanger bars and a hanger bar holder, according to some inventive implementations of the disclosure.

FIG. 4A is a front view of a hanger bar assembly 200, according to some inventive implementations of the disclosure. As shown, the hanger bar assembly 200 may include a first hanger bar 66A, a second hanger bar 66B, and a hanger bar holder 56. The first hanger bar 66A may be mechanically coupled to the second hanger bar 66B such that the first hanger bar 66A slides relative to the second hanger bar 66B in a telescopic manner along a first axis. The hanger bar holder 56 may be used to hold at least one of the first hanger bar 66A or the second hanger bar 66B such that the first hanger bar 66A and/or the second hanger bar 66B slides in a telescopic manner relative to the bar hanger holder 56 along the first axis. The hanger bar holder 56 may also be used to couple the hanger bar assembly 200 to various housings of a lighting system (not shown) for assembly and installation including, but not limited to, a junction box, a can housing, a luminaire frame, or a bracket.

The first hanger bar 66A and the second hanger bar 66B may each be a rail-like structure that couples together such that the first hanger bar 66A and the second hanger bar 66B may slide relative to one another along the first axis. The first hanger bar 66A and the second hanger bar 66B may thus be extended or retracted to accommodate various spacings between support structures (e.g., joists), which are used for attachment during installation of a lighting system coupled to the hanger bar assembly 200. As shown in FIG. 4A, the first hanger bar 66A may have a cross-sectional shape with a substantially uniform thickness. A uniform thickness can improve ease of manufacturing by allowing the first hanger bar 66A to be formed from a sheet of material. For example, the first hanger bar 66A may be manufactured by bending a metallic sheet such that the desired rail-like structure is formed. In some implementations, the first hanger bar 66A and the second hanger bar 66B may each have a thickness substantially equal to each other.

Figure 4C:
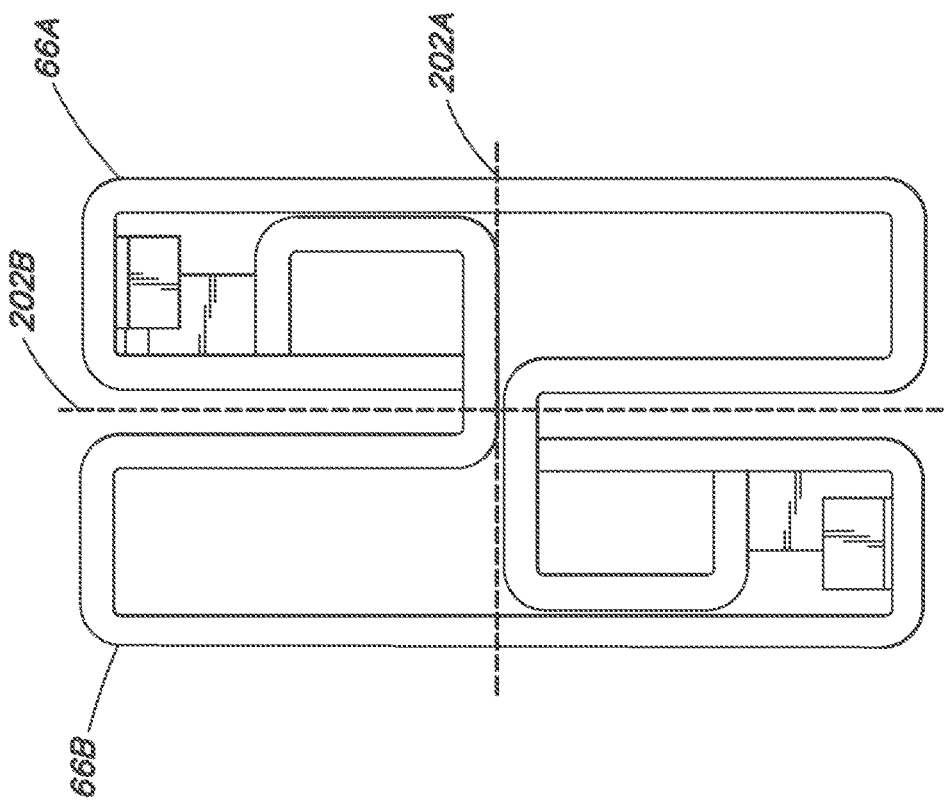
FIG. 4C is a front view of the hanger bars of FIG. 4A detailing several planes of antisymmetry when the hanger bars are assembled together.
Figure 4B:
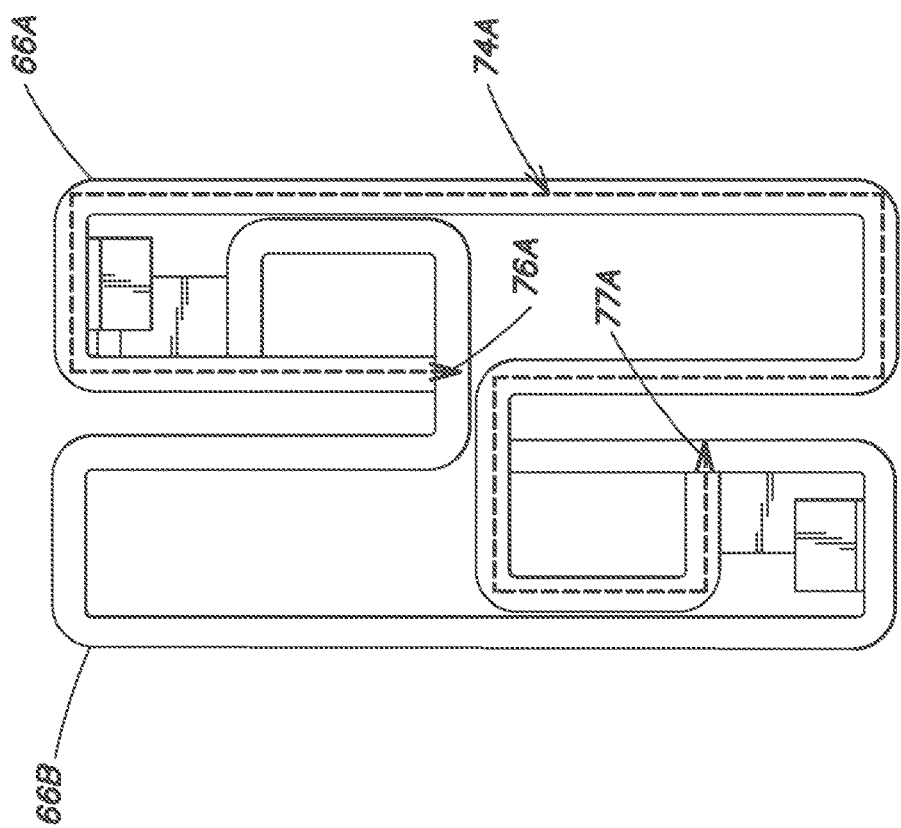
FIG. 4B is a front view of the hanger bars of FIG. 4A detailing the curve used to define the cross-sectional shape of the hanger bars.

As shown in FIG. 4B, the cross-sectional shape of the first hanger bar 66A may be based, in part, on a curve 74A with a first endpoint 76A and a second endpoint 77A. A first tangent vector corresponding to the first endpoint 76A defines the orientation of the surface of the first hanger bar 66A at the first endpoint 76A. Similarly, a second tangent vector corresponding to the second endpoint 77A defines the orientation of the surface of the first hanger bar 66A at the second endpoint 77A. The relative angle between first tangent vector and the second vector may vary between about 0 degrees (e.g., the first tangent vector and the second tangent vector are parallel) to about 90 degrees (e.g., the first tangent vector and the second tangent vector are perpendicular).

The cross-sectional shape of the first hanger bar 66A may include an interior passageway 68A designed to accommodate an interlocking structure 75B of the second hanger bar 66B, which will be discussed in greater detail below. The second hanger bar 66B may similarly include an interior passageway 68B to accommodate an interlocking structure 75A of the first hanger bar 66A. Mechanical stops 70A and 72A may also be disposed at opposing ends of the first hanger bar 66A along the first axis. The second hanger bar 66B may similarly include mechanical stops 70B and 72B disposed at opposing ends of the second hanger bar 66B along the first axis. The mechanical stops 70A, 72A, 70B, and 72B may provide a mechanical barrier to prevent the first hanger bar 66A and the second hanger bar 66B from separating, especially when the first hanger bar 66A is fully extended from the second hanger bar 66B. For example, mechanical stop 70A may physically contact mechanical stop 72B. Similarly, mechanical stop 70B may physically contact 72A.

The first hanger bar 66A may include the interlocking structure 75A, which is used to interlock the first hanger bar 66A with the second hanger 66B. The interlocking structure 75A reduces unwanted lateral motion (e.g., lateral backlash or slop) between the first hanger bar 66A and the second hanger bar 66B, which can improve the structural stability of the hanger bar assembly 200, particularly when the first hanger bar 66A is fully extended from the second hanger bar 66B such that a small portion of the first hanger bar 66A overlaps with the second hanger bar 66B. As an exemplary reference coordinate system, the first axis may correspond to a horizontal axis of motion; hence, lateral motion between the hanger bars 66A and 66B may be reduced along a second axis perpendicular to the first axis (e.g., horizontal lateral motion) and a third axis perpendicular to both the first axis and the second axis (e.g., vertical lateral motion). The reduction in unwanted lateral motion may be accomplished, in part, by the interlocking structure 75A having structural features that physically contact multiple locations along the second hanger bar 66B such that movement along the second axis and the third axis between the first hanger bar 66A and the second hanger bar 66B is restricted. The interlocking structure 75A may be integrated into the hanger bar 66A such that the first hanger bar 66A is a single continuous structure. The second hanger bar 66B may similarly include the interlocking structure 75B, which may also be used to interlock the second hanger bar 66B with the first hanger bar 66A.

For example, FIG. 4A shows the interlocking structure 75A may have a C-shaped cross-section disposed primarily within the interior passageway 68B of the second hanger bar 66B. The interlocking structure 75A includes several areas that physically contact the interior walls of the second hanger bar 66B within the interior passageway 68B, thereby restricting unwanted lateral motion along the second axis and the third axis. The second hanger bar 66B may similarly include the interlocking structure 75B, which may also have a C-shaped cross-section disposed primarily within the interior passageway 68A of the first hanger bar 66A. It should be appreciated that the first hanger bar 66A and the second hanger bar 66B may be interlocked using at least one of the interlocking structures 75A or 75B. However, the use of both interlocking structures 75A and 75B may further improve structural stability of the hanger bar assembly 200 by increasing the number of areas where the first hanger bar 66A physically contacts the second hanger bar 66B.

The first hanger bar 66A physically contacts the second hanger bar 66B through the respective interlocking structures 75A and 75B, respectively, and/or other areas of the first hanger bar 66A that may abut the second hanger bar 66B without necessarily providing mechanical constraint to lateral motion. In some implementations, the first hanger bar 66A and/or the second hanger bar 66B may be shaped and dimensioned to generate a frictional force between the first hanger bar 66A and the second hanger bar 66B along the respective regions where physical contact occurs. The frictional force may be used, in part, to maintain a relative position between the first hanger bar 66A and the second hanger bar 66B. For example, a user may apply a force to adjust the relative position of the first hanger bar 66A to the second hanger bar 66B during installation. The frictional force may be tailored to be sufficiently large such that once the user is no longer applying a force to the hanger bar assembly 200, the relative position between the first hanger bar 66A and the second hanger bar 66B is maintained.

In some implementations, the first hanger bar 66A and the second hanger bar 66B may be substantially identical or identical in shape and/or dimension. For such cases, the assembly of the first hanger bar 66A and the second hanger bar 66B results in a cross-sectional geometry that may include at least one plane of symmetry and/or one plane of antisymmetry. For example, FIG. 4C shows the first hanger bar 66A and the second hanger bar 66B, when assembled, may include at least two planes of antisymmetry, e.g., plane 202A and plane 202B.

Various metals and plastics may be used to form the first hanger bar 66A and the second hanger bar 66B including, but not limited to, aluminum, carbon steel, stainless steel, polyethylene, or any other materials known to one of ordinary skill in the art. Depending on the materials used to form the first hanger bar 66A and the second hanger bar 66B, various manufacturing techniques may be used to fabricate the first hanger bar 66A and the second hanger bar 66B including, but not limited to, bending a sheet to form a desired cross-sectional shape, or extruding material through a mold where the mold defines a desired cross-sectional shape.

Figure 4D:
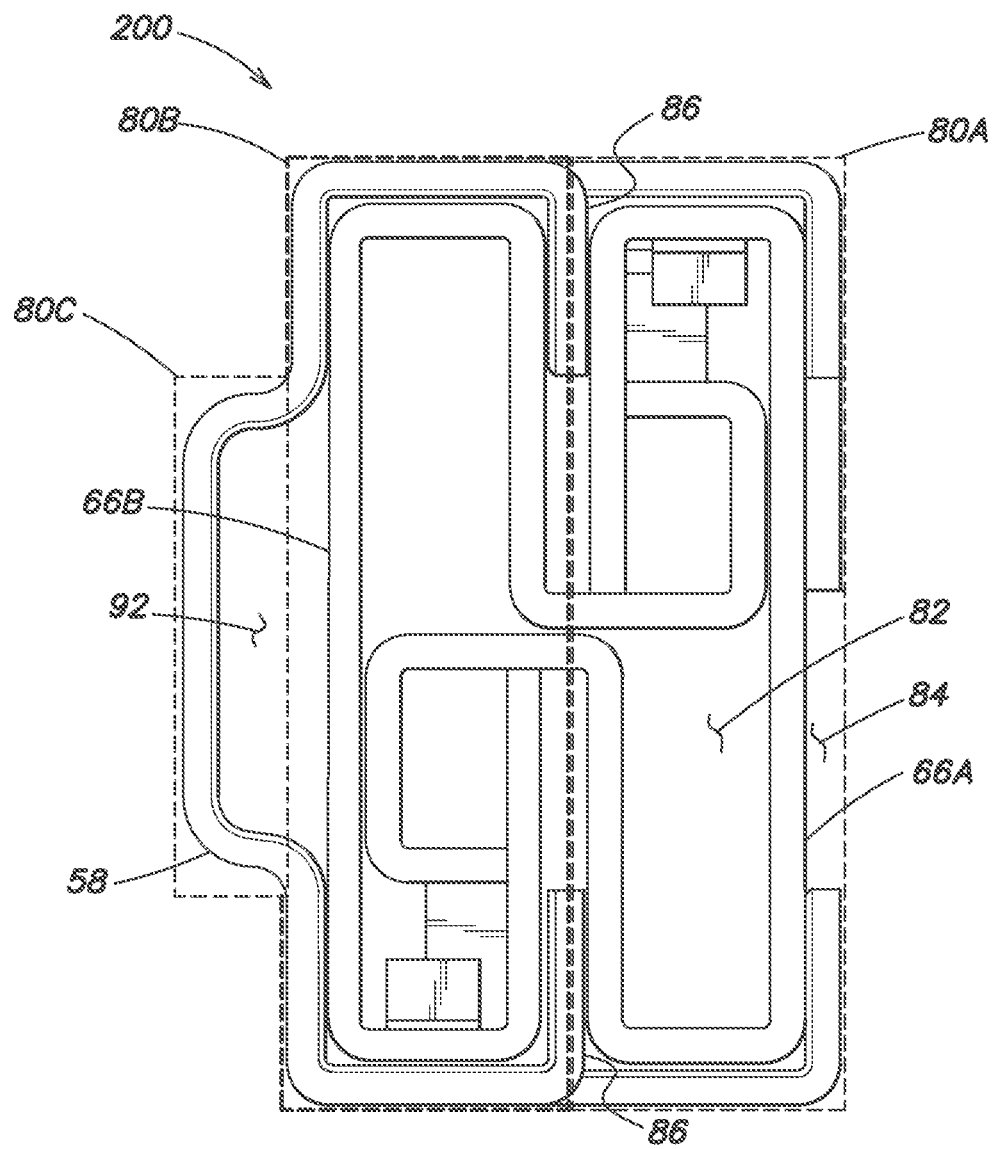
FIG. 4D is another view of the hanger bars of FIG. 4A showing subdivisions in the hanger bar holder.

The hanger bar assembly 200 may also include the hanger bar holder 56 to hold at least one of the first hanger bar 66A or the second hanger bar 66B. The hanger bar holder 56 may be used to guide the first hanger bar 66A and/or the second hanger bar 66B in a telescopic manner while providing a mechanical attachment to a housing of a lighting system as described above (e.g., a junction box, a can housing). The hanger bar holder 56 may include a frame 58 that forms a passageway 82 that partially surrounds the first hanger bar 66A and/or the second hanger bar 66B. In some implementations, the frame 58 may include an opening 84 that abuts the passageway 82. The opening 84 may span the length of the hanger bar holder 56 parallel to the first axis. The inclusion of the opening 84 improves manufacturability since a fully enclosed passageway 82 is more difficult to fabricate. Additionally, the inclusion of intermediate structural features (e.g., walls 86 in the hanger bar holder 56 as shown in FIG. 4D), would require additional, more complex manufacturing processes, which increases the time and cost to manufacture the hanger bar holder 56.

The frame 58 may have a cross-sectional shape with a substantially uniform thickness. Similar to the first hanger bar 66A and the second hanger bar 66B, a cross-section with a uniform thickness can improve ease of manufacturing by allowing the hanger bar holder 56 to be formed from a sheet. In some implementations, the thickness of the frame 58 may be substantially equal to the respective thicknesses of the first hanger bar 66A and the second hanger bar 66B, thus allowing the hanger bar holder 56, the first hanger bar 66A, and the second hanger bar 66B to all be fabricated from the same sheet of material.

In some implementations, the hanger bar holder 56 may be subdivided into several sections according to their function in the bar hanger assembly 200. For example, FIG. 4D shows the hanger bar holder 56 may be subdivided into a first section 80A, a second section 80B, and a third section 80C. The first section 80A may be used to guide at least the first hanger bar 66A through the hanger bar holder 56 along the first axis. The first section 80A may also be used to constrain lateral movement of the first hanger bar 66A relative to the hanger bar holder 56 along the second axis and the third axis defined above. The second section 80B may be similar to the first section 80A in that the second section 80B may be used to both guide the second hanger bar 66B through the hanger bar holder 56 along the first axis and constrain lateral movement of the second hanger bar 66B. The third section 80C may be used to facilitate coupling of the hanger bar holder 56 to a housing of a lighting system, as will be discussed below.

In some implementations, the first section 80A of the frame 58 forms a first track that only guides the first hanger bar 66A and the second section 80B of the frame 58 forms a second track that only guides the second hanger bar 66B. For example, FIG. 4C shows that only the first section 80A physically contacts the first hanger bar 66A. Similarly, only the second section 80B physically contacts the second hanger bar 66B. As shown, the intermediate walls 86 may overlap between the first section 80A and the second section 80B; however, a first side of the intermediate walls 86 only contacts the first hanger bar 66A and a second side of the intermediate walls 86 only contacts the second hanger bar 66B.

In some implementations, the hanger bar holder 56 may constrain the lateral motion of the first hanger bar 66A and the second hanger 66B independently from one another such that the hanger bar holder 56 may hold only one of the first hanger bar 66A or the second hanger 66B without affecting the constraints imposed to reduce lateral movement. For example, the hanger bar holder 56 may be disposed near a first support structure. In order to reach an adjacent second support structure, the first hanger bar 66A and the second hanger bar 66B may need to be fully extended such that only one of the first hanger bar 66A or second hanger bar 66B is held within the hanger bar holder 56. As described above, a large gap is typically formed between a conventional hanger bar holder and a conventional hanger bar resulting in instability in the hanger bar assembly. By independently constraining the lateral motion of the first hanger bar 66A and the second hanger bar 66B, the hanger bar holder 56 can substantially reduce such instabilities.

The hanger bar holder 56 may have a length, parallel to the first axis, that covers a portion of the first hanger bar 66A and/or the second hanger bar 66B. Additionally, the hanger bar holder 56 may include different portions that each have a different length. For example, FIG. 5C shows a perspective view of the hanger bar holder 56. As shown, a portion 88A, corresponding to the first section 80A, may have a shorter length when compared to a portion 88B, corresponding to the second section 80B, which spans the length of the hanger bar holder 56. The inclusion of variable length portions in the hanger bar holder 56 may allow for multiple support structures to be formed along the length of the hanger bar holder 56. For example, the portion 88A may be used to form the first section 80A that contacts and guides the first hanger bar 66A while the portion 88B allows the intermediate walls 86 to be formed to contact and guide both the first hanger bar 66A and the second hanger bar 66B. Additionally, the use of variable length portions may also reduce the amount of material used to manufacture the hanger bar holder 56.

The hanger bar holder 56 may be a single, continuous structure, which further improves the ease of manufacture. It should be appreciated that the hanger bar holder 56 in the present disclosure does not require additional structural features for assembly and/or adjustment of the hanger bar assembly 200 as is found in conventional hangar bar holder structures. For example, the hanger bar holder 56 does not have to be significantly foldable and/or bendable. In another example, the hanger bar holder 56 does not need to include a hinge. In yet another example, the hanger bar holder 56 does not need to include a snap and/or a snap catch to surround the first hanger bar 66A and/or the second hanger bar 66B.

As described above, the third section 80C may be used to facilitate coupling of the hanger bar holder 56 to a housing of a lighting system. In some implementations, the hanger bar holder 56 may be integrated into the housing of the lighting system (e.g., the hanger bar holder is integrated onto a sheet metal frame of a luminaire housing). The third section 80C may include at least one coupling mechanism to mechanically couple the hanger bar holder 56 to a housing, which again may include, but is not limited to, a junction box, a can housing, a bracket, or a luminaire frame. Various types of coupling mechanisms may be used including, but not limited to, a screw fastener or a rivet. For example, FIG. 5C shows the hanger bar holder 56 has two coupling mechanisms 90, which in this case, are screw holes to receive a corresponding screw fastener.

The coupling mechanism may also include a stud (i.e., a protruding rod). The stud may be inserted into a slot on the housing of the lighting system such that the stud is adjustable along the slot. The slot may be oriented along at least one of the second axis or the third axis. For example, a slot oriented along the third axis would allow the hanger bar assembly 200 to be adjustable along a vertical axis if the first axis is a horizontal axis. Once inserted, the stud may be secured from the opposite side by another fastener (e.g., a wing screw) to secure the hanger bar assembly 200 to a desired position along the slot on the housing.

In some implementations, the third section 80C may jut away from the first section 80A and the second section 80B to form a clearance 92 between the frame 58 of the hanger bar holder 56 and the second hanger bar 66B. In some implementations, the clearance 92 may instead be formed between the hanger bar holder 56 and the first hanger bar 66A. The clearance 92 may provide space to accommodate at least a portion of the coupling mechanism 90. For example, the clearance 90 may contain the head of a screw fastener, which is coupled to the housing of the lighting system prior to insertion of the first hanger bar 66A and the second hanger bar 66B into the passageway 82 of the hanger bar holder 56.

Various metals and plastics may be used to form the hanger bar holder 56 including, but not limited to, aluminum, carbon steel, stainless steel, polyethylene, or any other materials known to one of ordinary skill in the art. Depending on the materials used to form the hanger bar holder 56, various manufacturing techniques may be used for fabrication including, but not limited to, bending a sheet to form a desired cross-sectional shape for the frame 58, or extruding material through a mold where the mold defines a desired cross-sectional shape for the frame 58.

Figure 5A:
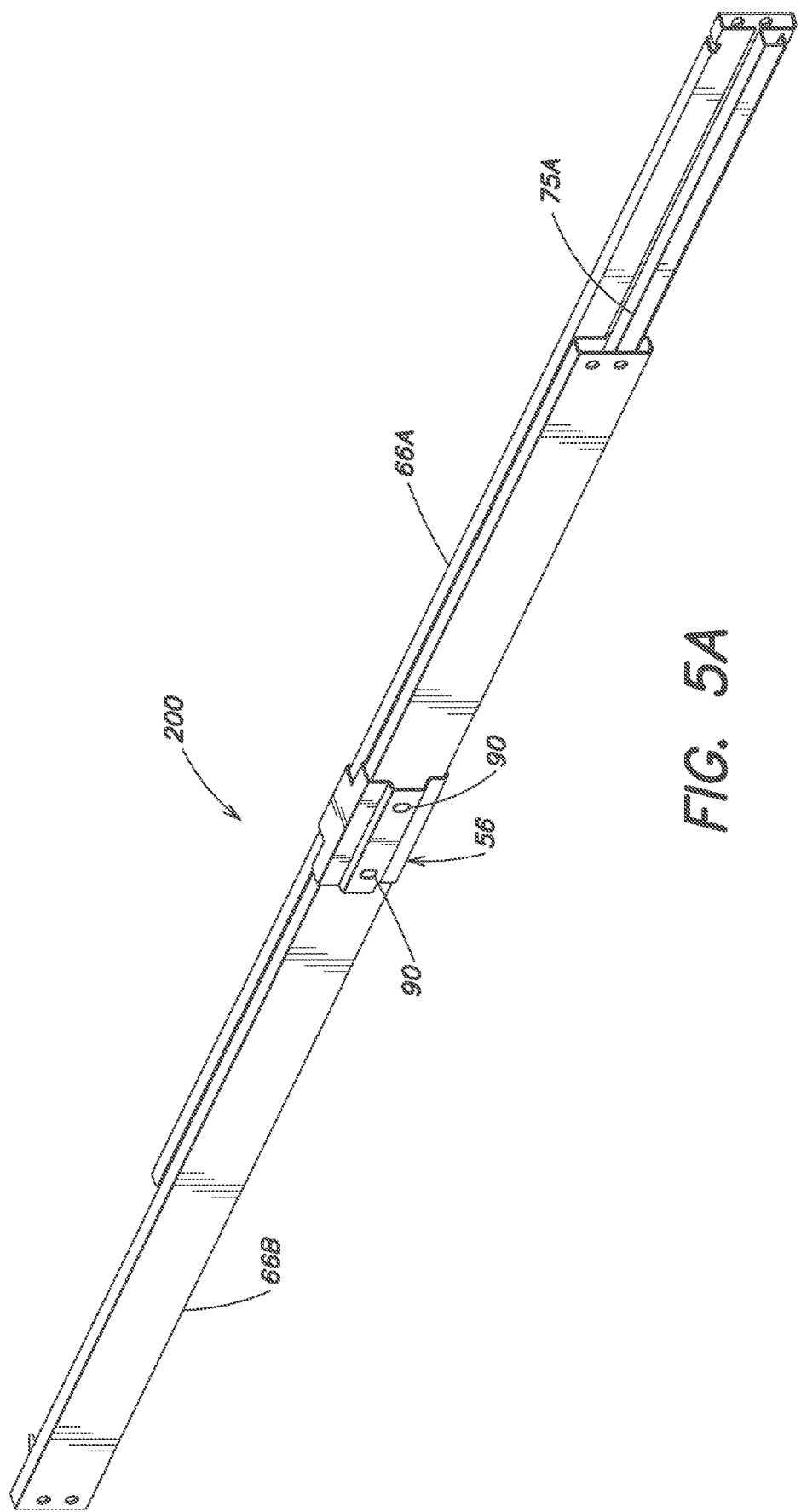
FIG. 5A shows a perspective view of the hanger bar assembly of FIG. 4A where the first hanger bar and the second hanger bar are disposed within the hanger bar holder.
Figure 5C:
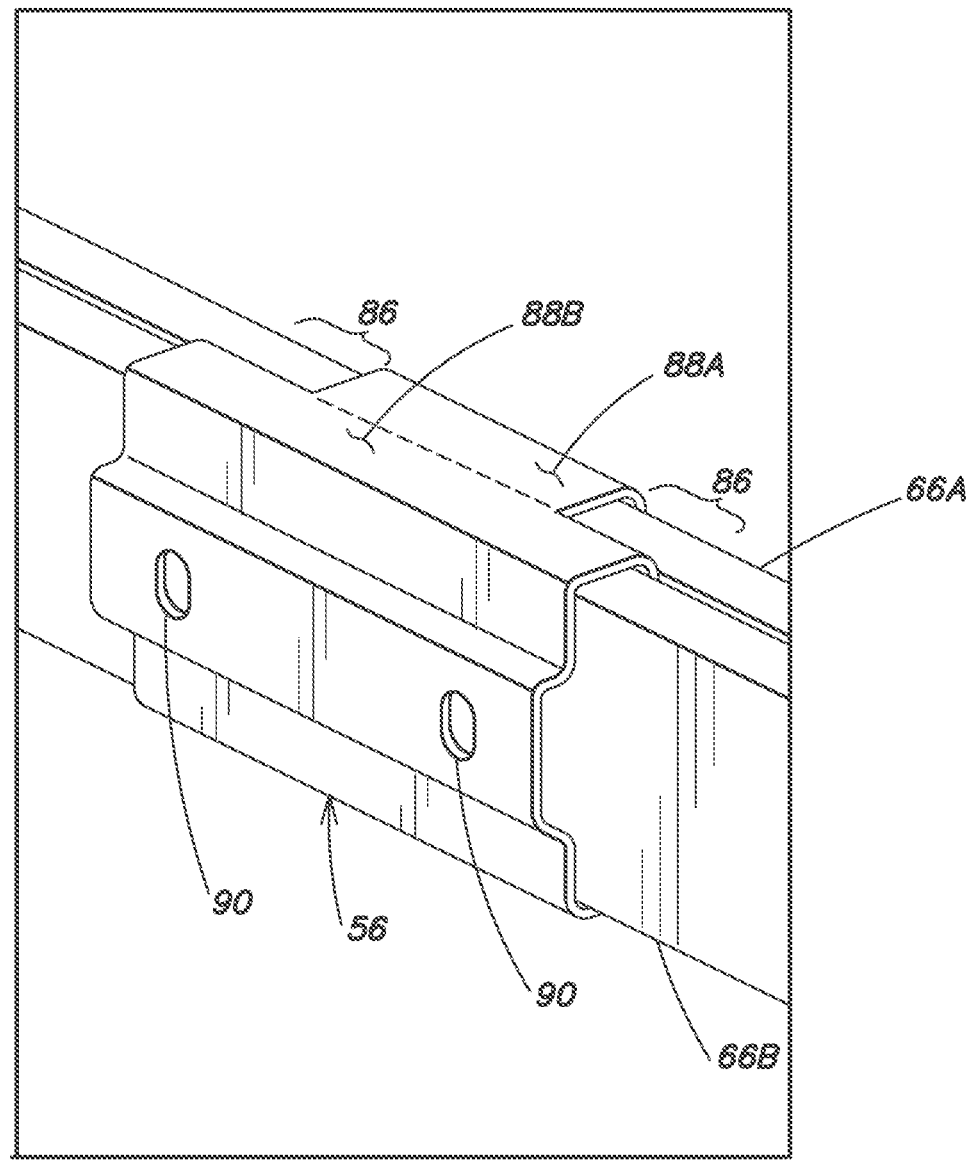
FIG. 5C shows a magnified view of the hanger bar holder of FIG. 5A.

FIG. 5A shows a perspective view of the hanger bar assembly 200 where the first hanger bar 66A and the second hanger are 66B are held by the hanger bar holder 56. As shown, the hanger bar holder 56 may hold the first hanger bar 66A and the second hanger bar 66B independently. Additionally, the first hanger bar 66A and the second hanger bar 66B may be interlocked using the interlocking structures 75A and 75B (not shown). As shown, the first hanger bar 66A and the second hanger bar 66B may be extended to traverse a large spacing between the support structure. Structural stability is preserved due, in part, to the interlocking structures 75A and 75B, which prevents gaps between the first hanger bar 66A and the second hanger bar 66B from causing backlash and slop.

FIG. 5B shows a perspective view of the hanger bar assembly 200 where the hanger bar holder 56 (which may be attached to a housing of a lighting system) is disposed proximate to a support structure (not shown) such that only the first hanger bar 66A is held by the hanger bar holder 56 while the second hanger bar 66B is fully extended to cover the spacing between adjacent support structures. As described above, the first section 80A of the hanger bar holder 56 may constrain unwanted lateral movement between the first hanger bar 66A and the hanger bar holder 56. In this manner, the hanger bar holder 56 may stably support the first hanger bar 66A during installation and/or adjustment of the hanger bar assembly 200.

It should be appreciated that the first hanger bar 66A, the second hanger bar 66B, and the hanger bar holder 56 may include many of the same features described above in connection with bars 5 and holder 6, such as fastening mechanisms 21 and mounting blocks 19. However, repeated descriptions of these components are omitted here for sake of clarity of the present embodiments.

CONCLUSION

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters and configurations described herein are meant to be exemplary inventive features and that other equivalents to the specific inventive implementations described herein may be realized. It is, therefore, to be understood that the foregoing implementations are presented by way of example and that, within the scope of the appended claims and equivalents thereto, inventive implementations may be practiced otherwise than as specifically described and claimed. Inventive implementations of the present disclosure are directed to each individual feature, system, article, and/or method described herein. In addition, any combination of two or more such features, systems, articles, and/or methods, if such features, systems, articles, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A hanger bar assembly (200), comprising:
   a first hanger bar (66A) having a first interlocking structure (75A);
   a second hanger bar (66B) having a second interlocking structure (75B) to interlock with the first hanger bar, the second hanger bar being mechanically coupled to the first hanger bar such that the second hanger bar slides relative to the first hanger bar in a telescopic manner along a first axis; and
   a hanger bar holder (56) to hold at least one of the first hanger bar or the second hanger bar,
   wherein:
   the first interlocking structure constrains lateral movement of the second hanger bar relative to the first hanger bar along a second axis, perpendicular to the first axis, and a third axis, perpendicular to the first axis and the second axis;
   the second interlocking structure constrains lateral movement of the first hanger bar to the second hanger bar along the second axis and the third axis;
   the hanger bar holder includes a frame (58) comprising:
      a first section (80A) to guide at least the first hanger bar through the hanger bar holder along the first axis and constrain lateral movement of the first hanger bar relative to the hanger bar holder along the second axis and the third axis; and
      a second section (80B) to guide at least the second hanger bar through the hanger bar holder along the first axis and constrain lateral movement of the second hanger bar relative to the hanger bar holder along the second axis and the third axis,
      wherein:
      the frame partially surrounds the first hanger bar and the second hanger bar so as to form a passageway (82) for the first hanger bar and the second hanger bar;
      the hanger bar holder has a length along the first axis; and
      at least a portion of the first section of the frame and the second section of the frame are overlapping along at least a portion of the length of the hanger bar holder.

2. The hanger bar assembly of claim 1, wherein the frame includes an opening (84) that abuts the passageway and spans the length of the frame.

3. The hanger bar assembly of claim 1, wherein the first section (80A) of the frame has a first length along the first axis less than the length of the hanger bar holder and the second section (80B) of the frame has a second length equal to the length of the hanger bar holder, the first section and the second section contacting at least one of the first hanger bar or the second hanger bar.

4. The hanger bar assembly of claim 1, wherein an assembly of the first hanger bar and the second hanger bar has a cross-sectional shape with at least two planes of antisymmetry.

5. The hanger bar assembly of claim 4, wherein the first hanger bar has a cross-sectional shape based on a curve having a first endpoint and a second endpoint such that a first tangent vector at the first endpoint is perpendicular to a second tangent vector at the second endpoint.

6. The hanger bar assembly of claim 1, wherein the first hanger bar and the second hanger bar are substantially identical or identical in shape and dimension.

7. The hanger bar assembly of claim 1, wherein the frame of the hanger bar holder has a substantially uniform thickness.

8. The hanger bar assembly of claim 7, wherein the first hanger bar and the second hanger bar each have a thickness substantially equal to the substantially uniform thickness of the frame of the hanger bar holder.

9. The hanger bar assembly of claim 1, wherein the hanger bar holder is formed as a single rigid part.

10. The hanger bar assembly of claim 1, wherein the hanger bar holder does not include a hinge.

11. The hanger bar assembly of claim 1, wherein:
    the first section constrains the lateral movement of the first hanger bar relative to the hanger bar holder along the second axis and the third axis independent of the second hanger bar; and
    the second section constrains the lateral movement of the second hanger bar relative to the hanger bar holder along the second axis and the third axis independent of the first hanger bar.

12. The hanger bar assembly of claim 1, wherein the hanger bar holder includes a third section having at least one coupling mechanism to mechanically couple the hanger bar holder to a housing, wherein the housing is at least one of a junction box, a can housing, a bracket, or a luminaire frame.

13. The hanger bar assembly of claim 12, wherein the at least one coupling mechanism is at least one of a screw fastener or a rivet.

14. The hanger bar assembly of claim 12, wherein the at least one coupling mechanism includes a stud to be inserted into a slot on the housing, the slot being oriented such that the hanger bar assembly is adjustable along at least one of the second axis or the third axis.

15. The hanger bar assembly of claim 1, wherein the first hanger bar is shaped so as to generate a frictional force between the first hanger bar and the second hanger bar, the frictional force being sufficiently large so as to maintain a relative position of the first hanger bar to the second hanger bar when no external force for adjusting the relative position is applied to the hanger bar assembly.

16. A hanger bar assembly (200), comprising:
    a first hanger bar (66A) having a first interlocking structure (75A);
    a second hanger bar (66B) having a second interlocking structure (75B) to interlock with the first hanger bar, the second hanger bar being mechanically coupled to the first hanger bar such that the second hanger bar slides relative to the first hanger bar in a telescopic manner along a first axis; and
    a hanger bar holder (56) to hold at least one of the first hanger bar or the second hanger bar,
    wherein:

the first interlocking structure constrains lateral movement of the second hanger bar relative to the first hanger bar along a second axis, perpendicular to the first axis, and a third axis, perpendicular to the first axis and the second axis;

the second interlocking structure constrains lateral movement of the first hanger bar to the second hanger bar along the second axis and the third axis;

the hanger bar holder (56) includes a frame (58) forming a passageway (82) and having an opening (84) that abuts the passageway, the opening spanning a length of the hanger bar holder where the length is parallel to the first axis;

the frame includes a first section (80A) having a first length along the first axis less than the length of the hanger bar holder and a second section (80B) of the frame has a second length equal to the length of the hanger bar holder;

the first section is configured to constrain lateral movement of the first hanger bar relative to the hanger bar holder along the second axis and the third axis independent of the second hanger bar when the first hanger bar is disposed within the first section;

the second section is configured to constrain lateral movement of the second hanger bar relative to the hanger bar holder along the second axis and the third axis independent of the first hanger bar when the second hanger bar is disposed within the second section; and the first hanger bar and the second hanger bar form an assembly having a cross-sectional shape with at least two planes of antisymmetry.

17. The hanger bar assembly of claim 16, wherein the first hanger bar and the second hanger bar are extended such that the hanger bar holder only holds the first hanger bar.

18. The hanger bar assembly of claim 16, wherein the first hanger bar is shaped so as to generate a frictional force between the first hanger bar and the second hanger bar, the frictional force being sufficiently large so as to maintain a relative position of the first hanger bar to the second hanger bar when no external force for adjusting the relative position is applied to the hanger bar assembly.

19. A hanger bar assembly (200), comprising:
a first hanger bar (66A);
a second hanger bar (66B) mechanically coupled to the first hanger bar such that the second hanger bar slides relative to the first hanger bar in a telescopic manner along a first axis; and
a hanger bar holder (56) to hold at least one of the first hanger bar or the second hanger bar, the hanger bar holder including a frame (58) comprising:
 a first section (80A) to guide at least the first hanger bar through the hanger bar holder along the first axis and constrain lateral movement of the first hanger bar relative to the hanger bar holder along a second axis, perpendicular to the first axis, and a third axis, perpendicular to the first axis and the second axis; and
 a second section (80B) to guide at least the second hanger bar through the hanger bar holder and constrain lateral movement of the second hanger bar relative to the hanger bar holder along the second axis and the third axis,
wherein:
the hanger bar holder is formed as a single, continuous part;
the hanger bar holder is not significantly foldable or bendable;
the hanger bar holder does not include a hinge;
the hanger bar holder does not include a snap and/or a snap catch; and
the first hanger bar and the second hanger bar have substantially identical or identical shapes and dimensions such that the first hanger bar is interchangeable with the second hanger bar.

20. The hanger bar assembly of claim 19, wherein:
the first hanger bar has a first interlocking structure, the first interlocking feature constraining lateral movement of the second hanger bar relative to the first hanger bar along the second axis and the third axis; and
the second hanger bar has a second interlocking structure, the second interlocking feature constrains lateral movement of the first hanger bar to the second hanger bar along the second axis and the third axis.

21. The hanger bar assembly of claim 19, wherein the first hanger bar includes a mechanical stop to prevent separation of the first hanger bar from the second hanger bar.

22. The hanger bar assembly of claim 19, wherein the hanger bar holder includes a third section having at least one coupling mechanism to mechanically couple the hanger bar holder to a housing, wherein the housing is at least one of a junction box, a can housing, a bracket, or a luminaire frame.

23. The hanger bar assembly of claim 22, wherein the at least one coupling mechanism includes a stud to be inserted into a slot on the housing, the slot being oriented such that the hanger bar assembly is adjustable along at least one of the second axis or the third axis.

24. The hanger bar assembly of claim 19, wherein the first hanger bar is shaped so as to generate a frictional force between the first hanger bar and the second hanger bar, the frictional force being sufficiently large so as to maintain a relative position of the first hanger bar to the second hanger bar when no external force for adjusting the relative position is applied to the hanger bar assembly.

25. A hanger bar assembly (200), comprising:
a first hanger bar (66A);
a second hanger bar (66B) mechanically coupled to the first hanger bar such that the second hanger bar slides relative to the first hanger bar in a telescopic manner; and
a hanger bar holder (56) to hold and guide at least one of the first hanger bar or the second hanger bar, the hanger bar holder physically contacting the at least one of the first hanger bar or the second hanger bar to prevent lateral movement of the at least one of the first hanger bar or the second hanger bar with respect to the hanger bar holder,
wherein:
the first hanger bar and the second hanger bar are shaped and dimensioned to generate a force between at least a portion of the first hanger bar and at least a portion of the second hanger bar to maintain a relative position between the first hanger bar and the second hanger bar; and
the first hanger bar and the second hanger bar form an assembly having a cross-sectional shape with at least two planes of antisymmetry.

26. The hanger bar assembly of claim 25, wherein the force is a frictional force.

27. The hanger bar assembly of claim 25, wherein the force maintains the relative position between the first hanger bar and the second hanger bar only when no external force for adjusting the relative position is applied to the hanger bar assembly.

28. The hanger bar assembly of claim 25, wherein the first hanger bar and the second hanger bar have substantially identical shapes and dimensions.

29. The hanger bar assembly of claim 25, wherein:
the hanger bar holder has a length along the first axis; and
the hanger bar holder includes a first portion to hold and guide the first hanger bar and a second portion to hold and guide the second hanger bar, the first and second portions being co-located along at least a portion of the length of the hanger bar holder.

30. The hanger bar assembly of claim 25, wherein the hanger bar holder constrains the lateral movement of the first hanger bar independent of the second hanger bar and the lateral movement of the second hanger bar independent of the first hanger bar.

\* \* \* \* \*